US010499763B2

(12) United States Patent
Van Os et al.

(10) Patent No.: US 10,499,763 B2
(45) Date of Patent: *Dec. 10, 2019

(54) COFFEE BEAN PACKAGING CARTRIDGE AND COFFEE BEVERAGE SYSTEM INCLUDING SAME

(71) Applicant: Koninklijke Douwe Egberts B.V., Utrecht (NL)

(72) Inventors: Ivo Van Os, Utrecht (NL); Gerbrand Kristiaan de Graaff, Utrecht (NL); Job Leonardus Kneppers, Utrecht (NL); Richard Patrick Versluijs, Utrecht (NL); Christiaan Johannes Maria Moorman, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,227

(22) Filed: May 3, 2018

(65) Prior Publication Data
US 2018/0317696 A1    Nov. 8, 2018

Related U.S. Application Data

(63) Continuation of application No. 14/333,364, filed on Jul. 16, 2014, now Pat. No. 9,980,599, which is a
(Continued)

(30) Foreign Application Priority Data

Feb. 17, 2009   (NL) ...................................... 2002542
Apr. 6, 2009    (NL) ...................................... 2002719
(Continued)

(51) Int. Cl.
*A47J 42/50*     (2006.01)
*B65D 88/00*     (2006.01)
(Continued)

(52) U.S. Cl.
CPC ............... *A47J 31/42* (2013.01); *A47J 31/40* (2013.01); *A47J 42/50* (2013.01); *B65D 83/04* (2013.01); *B65D 83/0409* (2013.01)

(58) Field of Classification Search
CPC .. A47J 31/42; A47J 42/50; A23F 5/08; B65D 83/049; B65D 83/0409; B65D 83/06;
(Continued)

(56) References Cited

U.S. PATENT DOCUMENTS 1,429,487 A    9/1922   Campbell et al.
1,604,058 A    10/1926  Mager
(Continued)

FOREIGN PATENT DOCUMENTS

CN    1413340    4/2003
CN    2684712    3/2005
(Continued)

OTHER PUBLICATIONS

International Search Report for PCT/NL2010/050077, dated Aug. 5, 2010, 6 pages.
(Continued)

*Primary Examiner* — Reginald Alexander
(74) *Attorney, Agent, or Firm* — Foley & Lardner LLP

(57) ABSTRACT

A coffee bean packaging cartridge for holding and supplying multiple servings of coffee beans can be connected to a coffee beverage system. The cartridge includes a container having an outer wall defining an interior volume and an opening at one end thereof. A permanent, preferably non-removable closure member is fitted to the one end of the container and substantially covers the opening. An exit passage in the closure member, defines a coffee bean outlet, for transferring coffee beans from the interior volume. The closure member further has relatively movable closing means for selectively closing the exit passage to reduce
(Continued)

exposure of the coffee bean contents to surrounding air. The cartridge further includes connecting means for connecting the cartridge to a coffee beverage system. There is also provided a coffee beverage system that includes the coffee bean packaging cartridge as defined above and at least a dosing device and a grinding mechanism. The dosing device may includes a metering chamber for receiving a portion of coffee beans corresponding to an amount necessary for preparing a single serving of coffee beverage.

20 Claims, 29 Drawing Sheets

Related U.S. Application Data continuation of application No. 13/211,117, filed on Aug. 16, 2011, now abandoned, which is a continuation of application No. PCT/NL2010/050077, filed on Feb. 17, 2010.

(30) Foreign Application Priority Data

Apr. 17, 2009 (NL) .................... 2002764
Jul. 10, 2009 (NL) .................... 2003184

(51) Int. Cl.
 *A47J 31/42* (2006.01)
 *A47J 31/40* (2006.01)
 *B65D 83/04* (2006.01)

(58) Field of Classification Search
 CPC ........... B02C 2013/28672; B02C 2013/28618; B02C 13/286; G01F 11/18
 USPC ............... 99/286; 222/185.1, 361, 365, 366; 241/246, 247, 248, 250, 259.1
 See application file for complete search history.

(56) References Cited

U.S. PATENT DOCUMENTS

| | | |
|---|---|---|
| 1,752,006 A | 3/1930 | Kalb |
| 1,755,430 A | 4/1930 | Crosthwait, Jr. |
| 1,769,776 A | 7/1930 | Dryden et al. |
| 1,869,720 A | 8/1932 | Phelps et al. |
| 1,917,355 A | 7/1933 | Brand |
| 1,981,025 A | 11/1934 | Bird |
| 2,131,034 A | 9/1938 | Beck |
| 2,296,701 A | 9/1942 | Butler et al. |
| 2,552,167 A | 5/1951 | Gleasman |
| 2,579,393 A | 12/1951 | Modrey |
| 2,610,468 A | 9/1952 | McGill |
| 2,704,468 A | 3/1955 | Horton, Jr. et al. |
| 2,769,393 A | 11/1956 | Cardillo |
| 2,856,753 A | 10/1958 | Herzog |
| 2,884,269 A | 4/1959 | Reinke |
| 2,917,076 A | 12/1959 | Ramo |
| 2,930,216 A | 3/1960 | Carlos |
| 2,962,220 A | 11/1960 | Woods |
| 3,007,352 A | 11/1961 | Biedess |
| 3,036,551 A | 5/1962 | Shreckhise |
| 3,115,097 A | 12/1963 | Irvin |
| 3,263,968 A | 8/1966 | Nils |
| 3,313,332 A | 4/1967 | Otto |
| 3,356,097 A | 12/1967 | Schaap |
| 3,382,310 A | 5/1968 | Hann et al. |
| 3,490,685 A | 1/1970 | Ferri |
| 3,683,790 A | 8/1972 | Black et al. |
| 3,871,112 A | 3/1975 | Licitis |
| 3,921,178 A | 11/1975 | Weisgerber |
| 3,973,623 A | 8/1976 | Sarll |
| 3,981,234 A | 9/1976 | Nelson et al. |
| 4,271,753 A | 6/1981 | Neely |
| 4,305,328 A | 12/1981 | Kueser et al. |
| 4,326,114 A | 4/1982 | Gerling et al. |
| 4,476,776 A | 10/1984 | Greutert et al. |
| 4,555,984 A | 12/1985 | Yamashita |
| 4,644,856 A | 2/1987 | Borgmann |
| 4,791,859 A | 12/1988 | King |
| 4,843,956 A | 7/1989 | Lashlee |
| 4,865,089 A | 9/1989 | McFarlane |
| 4,876,953 A | 10/1989 | Imamura et al. |
| 4,925,150 A | 5/1990 | Tedioli |
| 4,936,515 A | 6/1990 | Poag et al. |
| 5,094,153 A | 3/1992 | Helbling |
| 5,193,438 A | 3/1993 | Courtois |
| 5,217,108 A | 6/1993 | Newnan |
| 5,241,898 A | 9/1993 | Newnan |
| 5,267,507 A | 12/1993 | Enomoto |
| 5,309,820 A | 5/1994 | Baxter et al. |
| 5,312,637 A | 5/1994 | Midden |
| 5,338,409 A | 8/1994 | Heierli |
| 5,351,604 A | 10/1994 | King et al. |
| 5,386,944 A | 2/1995 | Knepler et al. |
| 5,406,882 A | 4/1995 | Shaanan |
| 5,463,934 A | 11/1995 | Locati |
| 5,632,449 A | 5/1997 | Sandolo |
| 5,632,499 A | 5/1997 | Hutcherson et al. |
| 6,067,894 A | 5/2000 | Eugster |
| 6,079,314 A | 6/2000 | MacKinnon |
| 6,339,985 B1 | 1/2002 | Whitney |
| 6,391,360 B1 | 5/2002 | Stettes et al. |
| 6,889,599 B2 | 5/2005 | Koslow |
| 6,962,104 B1 | 11/2005 | Podlucky et al. |
| 6,968,775 B2 | 11/2005 | Burrows et al. |
| 7,013,796 B2 | 3/2006 | Smit |
| 7,032,322 B1 | 4/2006 | Smith |
| 7,051,646 B2 | 5/2006 | Della Pietra et al. |
| 7,067,168 B1 | 6/2006 | Podlucky et al. |
| 7,240,611 B2 | 7/2007 | Burrows et al. |
| 7,318,374 B2 | 1/2008 | Guerrero |
| 7,340,991 B2 | 3/2008 | Burrows |
| 7,461,587 B2 | 12/2008 | Guerrero |
| 7,475,628 B2 | 1/2009 | Lussi |
| 7,858,135 B2 | 12/2010 | Radosav |
| 8,047,124 B2 | 11/2011 | Lin |
| 8,382,017 B2 | 2/2013 | Bich |
| 8,383,180 B2 | 2/2013 | Vastardis |
| 8,439,235 B2 | 5/2013 | Mih et al. |
| 8,601,937 B2 | 12/2013 | Campetella et al. |
| 8,776,671 B2 | 7/2014 | Van Os et al. |
| 8,950,318 B2 | 2/2015 | Ford |
| RE45,476 E | 4/2015 | Burrows et al. |
| 9,265,377 B2 | 2/2016 | De Graaff et al. |
| 9,277,838 B2 | 3/2016 | De Graaff et al. |
| 2002/0002908 A1 | 1/2002 | Clean et al. |
| 2002/0092941 A1 | 7/2002 | Henderson et al. |
| 2002/0129712 A1 | 9/2002 | Westbrook et al. |
| 2002/0153438 A1 | 10/2002 | Glucksman et al. |
| 2003/0025012 A1 | 2/2003 | Lassota |
| 2004/0025703 A1 | 2/2004 | Ming |
| 2004/0173101 A1 | 9/2004 | Steckhan |
| 2005/0017107 A1 | 1/2005 | Steckhan |
| 2005/0028677 A1 | 2/2005 | Smit |
| 2005/0258287 A1 | 11/2005 | Rohde |
| 2007/0062378 A1 | 3/2007 | Glucksman et al. |
| 2007/0137495 A1 | 6/2007 | Talbert |
| 2007/0295752 A1 | 12/2007 | Morin et al. |
| 2008/0098901 A1 | 5/2008 | Lee |
| 2008/0152478 A1 | 6/2008 | Yen et al. |
| 2009/0127363 A1 | 5/2009 | Malykke |
| 2009/0145302 A1 | 6/2009 | Dutertre et al. |
| 2009/0155302 A1 | 6/2009 | Bachmann et al. |
| 2009/0165655 A1 | 7/2009 | Aonuma |
| 2010/0080886 A1 | 4/2010 | Hourizadeh |
| 2010/0308141 A1 | 12/2010 | Bich |
| 2011/0073690 A1 | 3/2011 | Leung et al. |
| 2013/0095218 A1 | 4/2013 | De Graaff et al. |
| 2013/0095219 A1 | 4/2013 | De Graaff et al. |

(56) References Cited

U.S. PATENT DOCUMENTS

| | | |
|---|---|---|
| 2013/0101717 A1 | 4/2013 | De Graaff et al. |
| 2013/0115351 A1 | 5/2013 | Van Os et al. |
| 2015/0118367 A1 | 4/2015 | Os et al. |

FOREIGN PATENT DOCUMENTS

| | | |
|---|---|---|
| CN | 2684713 | 3/2005 |
| CN | 1830369 A | 9/2006 |
| CN | 201005518 | 1/2008 |
| DE | 29 26 389 | 1/1981 |
| DE | 20300933 | 5/2004 |
| DE | 20300928 | 7/2004 |
| DE | 10 2007 008 898 | 8/2008 |
| DE | 10 2007 008 900 | 10/2008 |
| EP | 0 182 137 A1 | 5/1986 |
| EP | 0 452 214 | 10/1991 |
| EP | 0 543 591 A1 | 5/1993 |
| EP | 0 605 750 A1 | 7/1994 |
| EP | 0 766 943 A1 | 4/1997 |
| EP | 0 804 894 | 11/1997 |
| EP | 1 700 549 | 9/2006 |
| EP | 2 067 421 | 6/2009 |
| EP | 2 403 386 | 1/2012 |
| FR | 2565088 | 12/1985 |
| GB | 2 447 678 | 9/2008 |
| JP | 55-017956 | 2/1980 |
| JP | 57-194178 | 11/1982 |
| JP | 06-046437 | 11/1994 |
| JP | 07-505328 | 6/1995 |
| JP | H07-505323 | 6/1995 |
| JP | 2003-518676 | 6/2003 |
| JP | 2004-073533 A | 3/2004 |
| WO | WO-94/07401 | 4/1994 |
| WO | WO-00/27262 | 10/2000 |
| WO | WO-01/48711 | 7/2001 |
| WO | WO-2004/023956 | 3/2004 |
| WO | WO-2009/046771 A1 | 4/2009 |
| WO | WO-2010/095937 | 8/2010 |

OTHER PUBLICATIONS

International Search Report for PCT/NL2011/050108, dated Dec. 23, 2011, 5 pages.
International Search Report for PCT/NL2011/050109, dated Dec. 27, 2011, 6 pages.
International Search Report for PCT/NL2011/050110, dated Apr. 19, 2011, 3 pages.
International Search Report for PCT/NL2011/050114, dated Oct. 25, 2011, 6 pages.

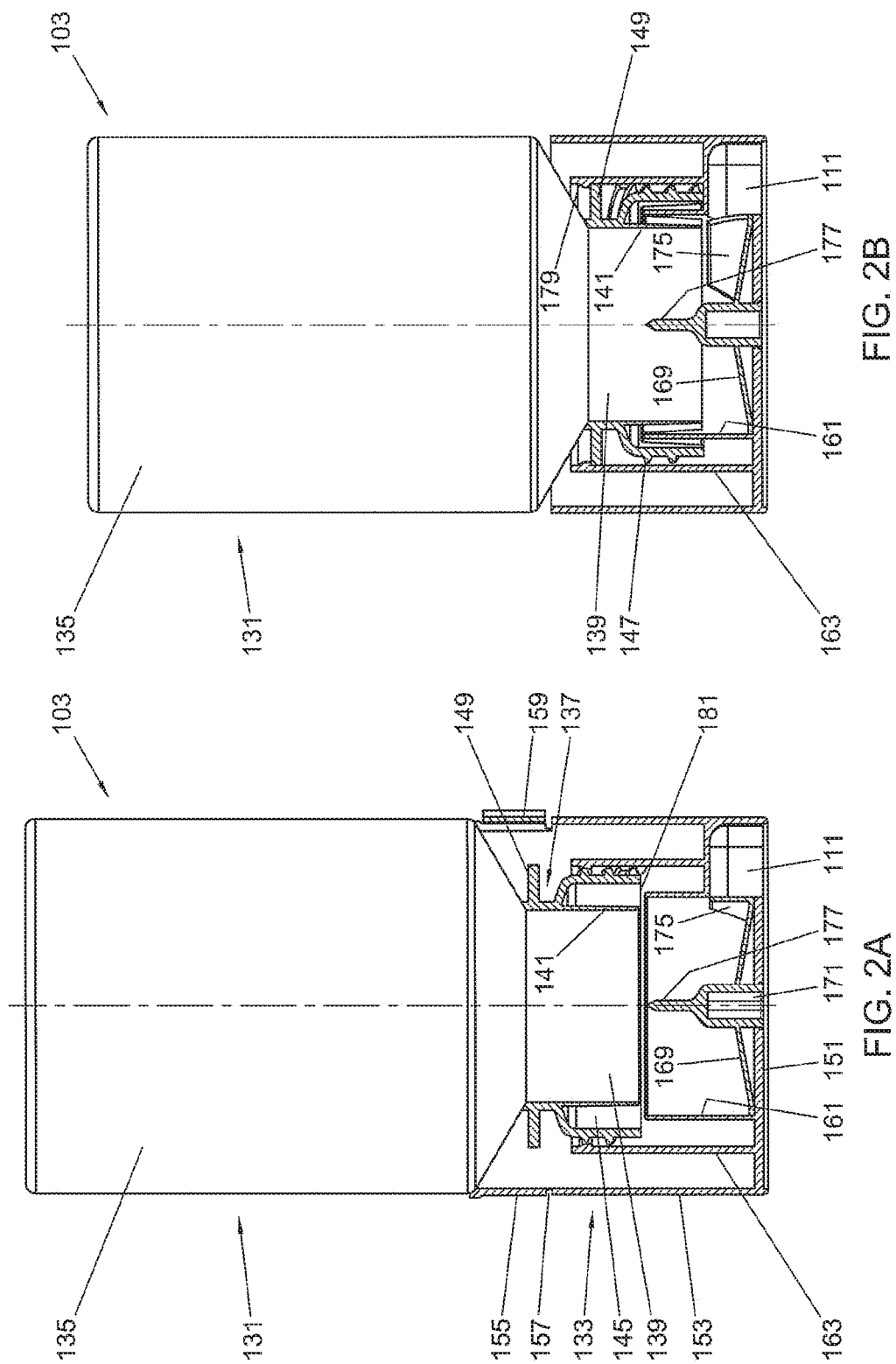

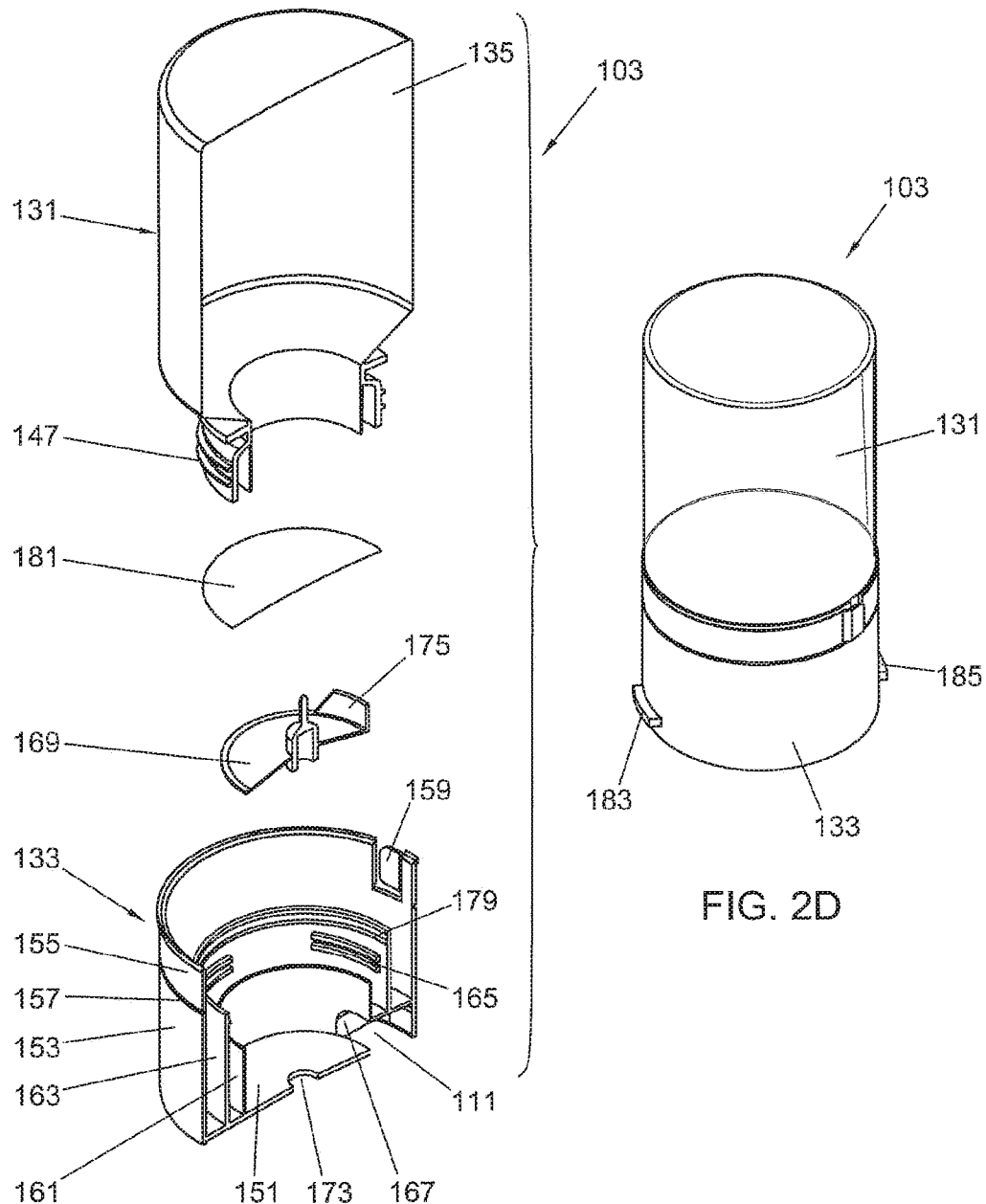

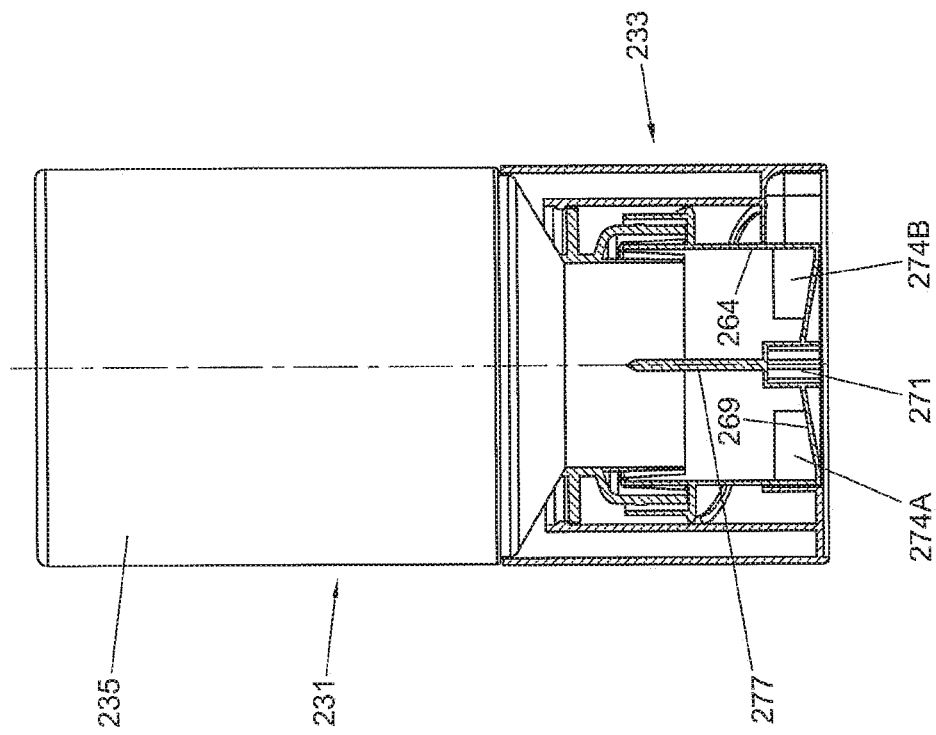
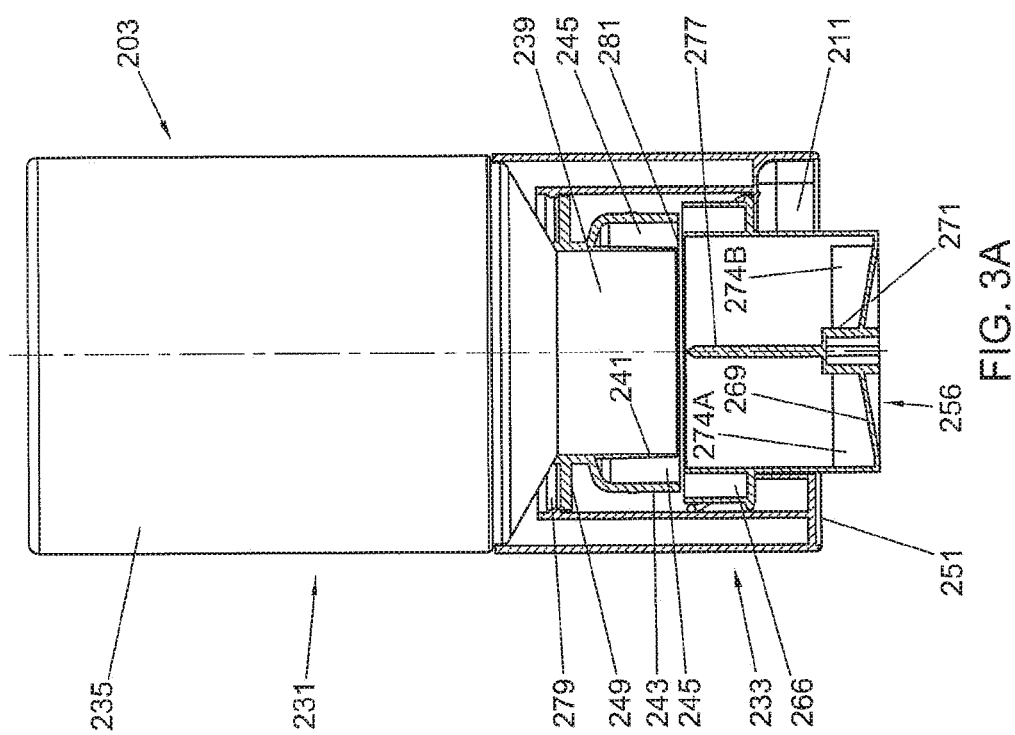

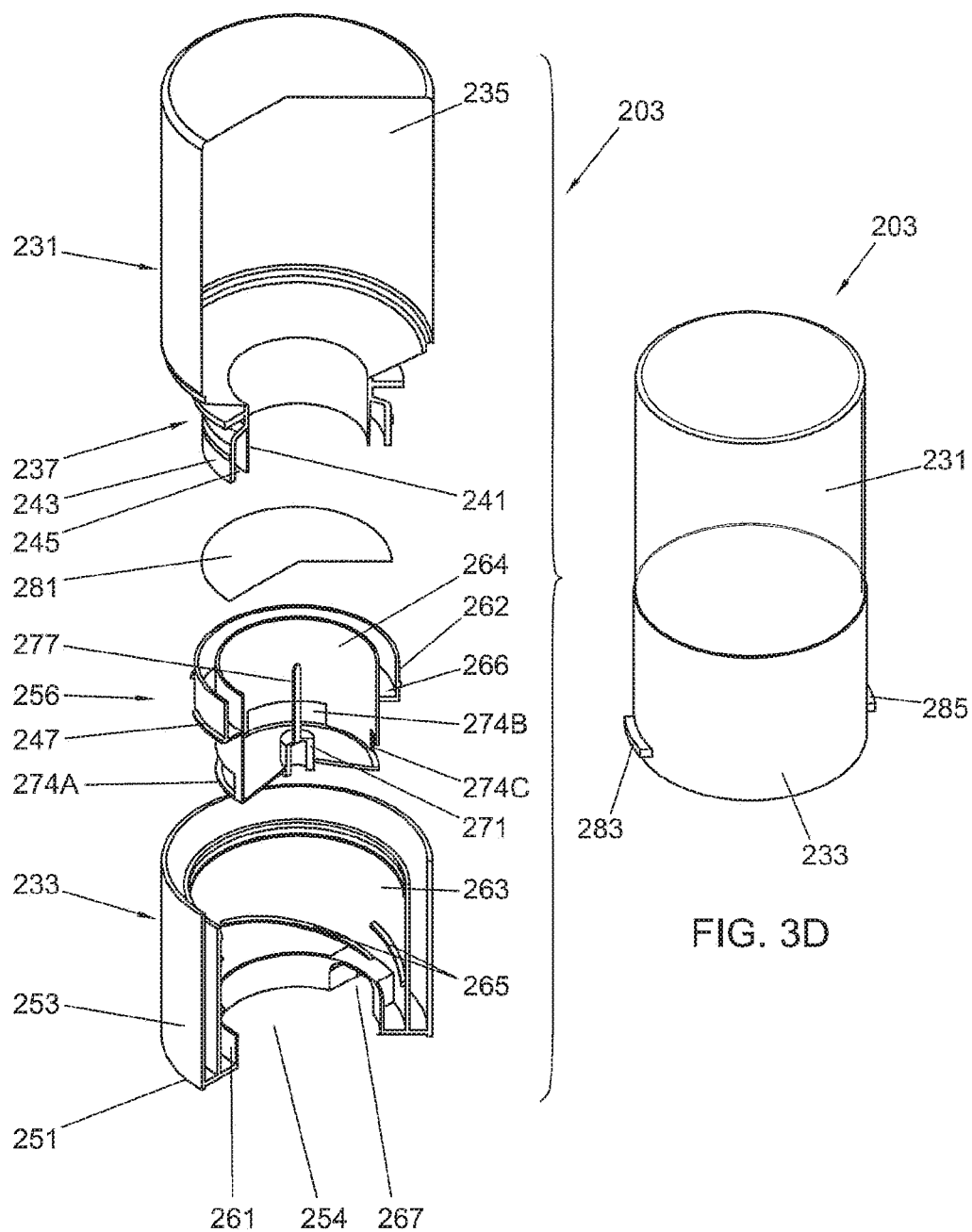

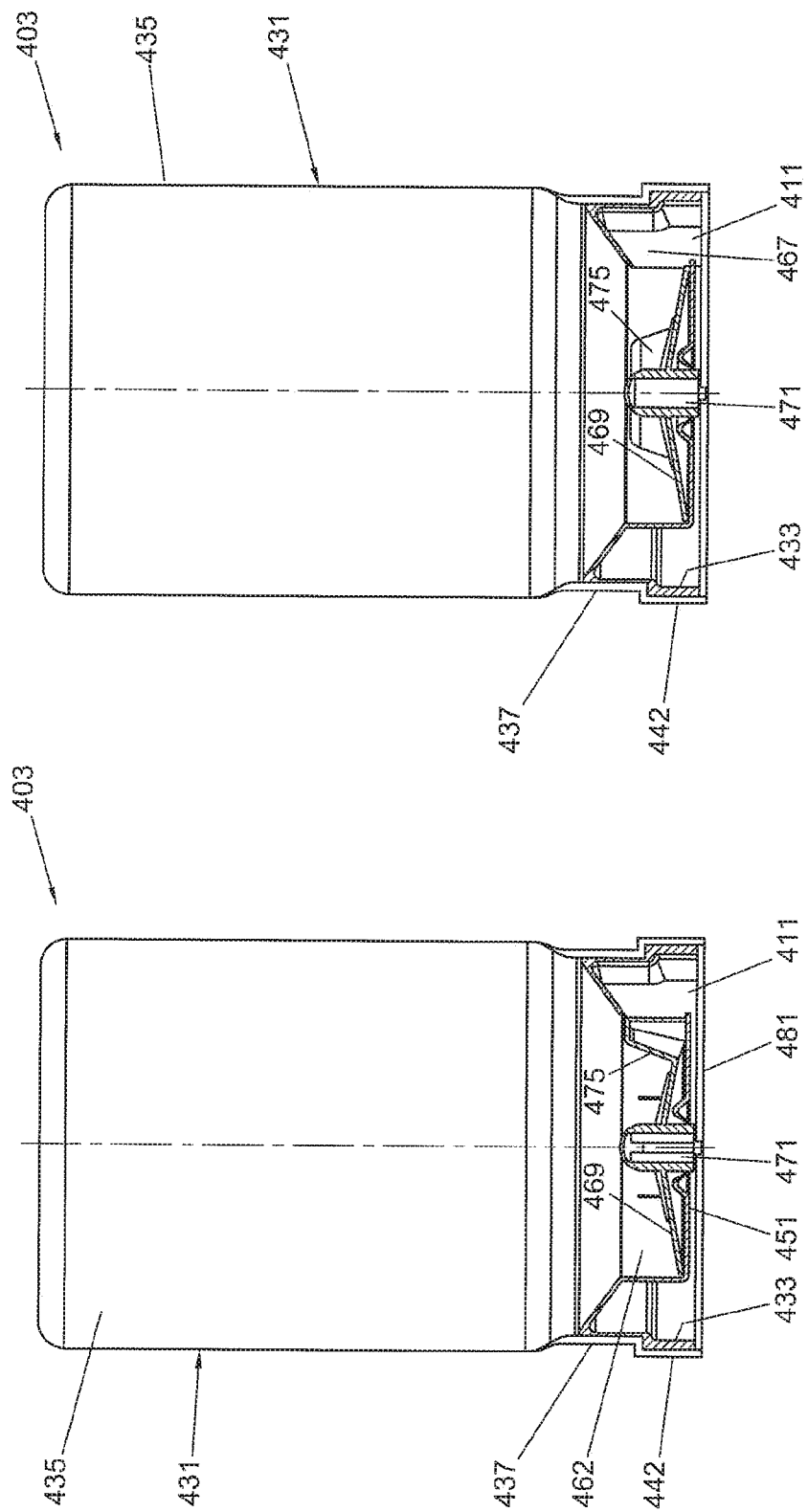

COFFEE BEAN PACKAGING CARTRIDGE AND COFFEE BEVERAGE SYSTEM INCLUDING SAME

CROSS-REFERENCE TO RELATED APPLICATIONS

The present application is a continuation of U.S. patent application Ser. No. 14/333,364, filed Jul. 16, 2014, which is a continuation of U.S. patent application Ser. No. 13/211,117, filed Aug. 16, 2011, which is a continuation of International Patent Application No. PCT/NL2010/050077 filed on Feb. 17, 2010, which claimed priority to Netherlands Application Serial Nos. NL2002542 filed on Feb. 17, 2009, NL2002719 filed on Apr. 6, 2009, NL2002764 filed on Apr. 17, 2009, and NL2003184 filed on Jul. 10, 2009. All of these applications are hereby incorporated herein by reference in their entireties.

BACKGROUND

The invention relates to a coffee bean packaging cartridge having an interior volume for accommodating coffee beans. In particular the invention relates to such cartridges that form part of a system for preparing coffee beverages and can be hermetically sealed prior to use.

It is known to pack roasted coffee beans in gastight containers that can be connected to coffee brewing apparatus that include a grinding mechanism. For such systems to be efficient the containers have often been designed to hold between 1 kg and 3 kg of coffee beans. The contents of such containers will be a single type or a single blend of coffee beans. Discerning consumers are increasingly interested in having a choice of freshly ground bean varieties for their coffee beverage. The known bean containers for use in coffee beverage systems fall short of offering a choice of coffee beans or blends of coffee beans. Once the known container has been installed on the known coffee brewing apparatus, it must first be completely emptied before it can be exchanged by a container holding a different variety or blend of coffee beans. While it has been proposed by WO 2004/023956 to use coffee bean containers that contain only a single serving of beans, this solution is also not without drawbacks. Apart from being less economic in terms packaging and waste control, it is also not possible to adjust the dosage of the single serving to the particular needs of a consumer, unless every bean variety or blend is additionally offered in differently sized or filled bean containers. The logistic difficulties associated with such an option are bound to make it unworkable in practise.

SUMMARY

Accordingly it is an object of the present invention to propose an improved coffee bean packaging cartridge, an improved coffee bean dosing device and system for preparing coffee beverages of the above referred to kind. In a more general sense it is thereby an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

To this end according to one aspect of the invention there is provided a coffee bean packaging cartridge for holding and supplying multiple servings of coffee beans, the cartridge including: a container having an outer wall defining an interior volume and being open on at least one end thereof, the container holding at least one serving of coffee beans; conveyor means adapted to be rotatably driven exteriorly of the cartridge; and coupling means adapted for drivingly coupling the conveyor means to driving or motive means of a coffee brewing apparatus, wherein the cartridge is openable or open to reveal an exit opening defining a coffee bean outlet. In this regard it can be advantageous when a movable conveyor means is associated with the exit passage and is adapted to be driven exteriorly of the closure member.

It is further advantageous for the cartridge according to the invention, when the rotatably driven conveyor means includes bean agitating means or when it includes vibrating means.

Similarly the rotatably driven conveyor means may include movable conveyor means, or more particularly rotatably movable conveyor means. Advantageously the rotatably driven conveyor means may include a rotating surface element. Such a rotating surface element may advantageously be formed as a conveyor disc. A surface of the conveyor disc confronting the at least one serving of coffee beans can preferably be convex, by being higher in its center and lower towards its periphery. Then such a conveyor disc can be adapted to be driven at a relatively fast rotational speed for conveying the beans by centrifugal force. Alternatively the conveyor disc may also be adapted to be driven at a relatively moderate rotational speed for conveying the beans along guiding means, such as radial ridge formations on a surface of the disc confronting the at least one serving of coffee beans. The guiding means may also include a stationary guide arm overlying a portion of the surface of the conveyor disc confronting the at least one serving of coffee beans and adapted to guide coffee beans from the conveyor disc toward the exit opening.

The cartridge according to the invention, may further advantageously including a permanent, preferably non-removable closure member fitted to the at least one end and substantially including the exit opening. In combination therewith the closure member may further include an exit passage, defining the exit opening, for transferring coffee beans from the interior volume. Preferably the closure member may have relatively movable closing means for selectively closing the exit passage to prevent escape of the coffee bean contents to surrounding air, wherein the cartridge further includes connecting means for connecting the cartridge to a coffee beverage system.

Such a coffee bean packaging container does not need to remain connected to the coffee beverage system until it is emptied completely. By the option of selectively closing the exit passage it may be temporarily removed from the system, to allow bean cartridges with different contents to be connected to the system intermediately. This enables to the consumer or customer to be offered a different taste of coffee, without having a plurality of costly systems operating in parallel. Preferably the relatively movable closing means may be adapted to be driven exteriorly of the closure member. In a particularly preferred arrangement the movable conveyor means and the relatively movable closing means can be fixed relative to each other. Such advantageous arrangements may include the conveyor means and the relatively movable closing means being integrally formed as one single element, in which case the movable conveyor means and the relatively movable closing means can be adapted to be commonly driven exteriorly of the closure member.

In a further advantageous arrangement of the invention the exit opening may be associated with a removable sealing element sealing the interior volume prior to activating of the cartridge prior to its use. It is thereby additionally advantageous when means are included for disrupting and displacing the sealing element. The sealing element can advantageously be a sealing membrane. In particular the means for disrupting and displacing can be a pull tab, so that it can be manually grasped and removed. In a further elaboration of the invention the means for disrupting and displacing may advantageously include a cylindrical wall that pushes the sealing membrane into an annular groove. In this way the sealing membrane remains attached to the cartridge which may facilitate its disposal. Moreover when the cylindrical wall is mechanically moved by the system that receives the cartridge, removal of the sealing means may be accomplished fully automatically. Rupture of the sealing membrane may be further assisted by further including a piercing pin projecting centrally of the conveyor disc. It may also be an advantage when the sealing membrane is a pre-weakened foil provided with a mechanically weakened area to control its disruption.

It is further helpful when a cartridge according to the invention has the conveyor disc provided with a driving hub. In that case the driving hub can also carry the piercing pin adapted to interact with the sealing membrane for disruption thereof.

Advantageously the cartridge according to the invention may have the container including a neck portion. Such a neck portion may then include a radially extending annular ridge to fixedly retain the closure member. Such a neck portion may also conveniently include a cylindrical inner sleeve and a cylindrical outer sleeve defining an annular groove there between. The sealing membrane is thereby conveniently adapted to be folded into the annular groove, while its perimeter will remain attached to the outer cylindrical sleeve. The cylindrical outer sleeve may further include an outer male screw thread for cooperation with elements of the closure member.

The container may advantageously be of rigid design and be executed in metal or plastic. When executed in plastic the container may advantageously be transparent, so that it contents may be surveyed.

In this regard the container may also have a bottle-like shape or be tubular. Of further advantage the cartridge according to the invention may include means within its interior volume for occupying space in the interior volume that has been vacated by the coffee beans. Such means for occupying vacated space may advantageously also include a gas and/or an inflatable bag. Such additional optional measures may assist in keeping the contents fresh over prolonged periods of time.

A cartridge according to the invention may also have its closure member define a bottom and a circumferential outer wall. In such an arrangement the relatively movable closing member can be adapted to be driven by a driving or motive means of an apparatus for preparing the coffee beverage via a central opening in the bottom. In this regard the movable conveyor means may be adapted to be driven by a driving means of an apparatus for preparing the coffee beverage via a central opening in the bottom. In particular and preferably the relatively movable closing means and the movable conveyor means can be adapted to be commonly driven via the central opening in the bottom.

The cartridge according to the invention in a preferred modification with the movable conveyor means being a rotatable conveyor disc may have the relatively movable closing means, for selectively closing the exit opening, may conveniently include a closing flap connected to the conveyor disc and in particular have the closing flap extend axially from the conveyor disc. The cartridge may further have its exit passage extend between a perimeter aperture and a coffee bean outlet. The exit passage may thereby be in the form of a cavity that is laterally offset from the column of coffee beans within the cartridge to prevent coffee beans clogging up or jamming the exit opening or bean outlet. Preferably the perimeter aperture is radially directed with respect to the cartridge, while the bean outlet is axially directed with respect to the cartridge. It is further advantageous when the exit passage, or laterally offset cavity, can hold a minimum of 1 gram of coffee beans, which corresponds to at least five beans. In volume the exit passage or cavity may be chosen in a range between 1 and 3 milliliters. The buffer created by the exit passage or cavity will also prevent any possible clipping effect of beans, when the cartridge is additionally provided with a closing device, such as a rotatable closing disk, that closes the bean outlet. This clipping effect may otherwise occur when beans would partially protrude from the bean outlet and interfere with the closing path of the closing disk. It is further advantageous when the entire cavity and bean passage, including the perimeter aperture and the bean outlet, has a cross-sectional area of at least 25 $mm^2$. On the other hand it is not necessary or practical for this cross-sectional area to be much larger than 400 $mm^2$. The cartridge according to the invention may further have its connecting means for connecting it to a coffee beverage system include radially extending bayonet elements for removably connecting to a coffee brewing apparatus, so as to form a coffee beverage system.

The invention further provides for a coffee beverage system that includes the removably connected coffee bean packaging cartridge as defined above and a coffee brewing apparatus comprising a control unit and motive means for drivingly engaging the coupling means of the coffee bean packaging cartridge in its connected state. Preferably the system further comprises a dosing device.

According to one alternative the dosing device may include timing means for determining a duration of rotatingly driving the conveyor means, in which case the control unit may be arranged to operate the driving means in response to the timing means.

The system according to the invention may further comprise a grinding mechanism.

The system according to the invention may also further comprise sensor means, in which case preferably the dosing device comprises at least one of the conveyor means and the relatively movable closing means.

In such a system it is advantageous when the dosing device includes a metering chamber for receiving a portion of coffee beans corresponding to an amount necessary for preparing a single serving of coffee beverage. Advantageous the amount of coffee beans for one serving is represented by 4 to 12 grams of coffee bean, preferably 6 to 8 grams of coffee beans and more preferably between 6.5 to 7.5 grams of coffee beans.

The system according to the invention preferably has the dosing device further comprise emptying means. According to one alternative arrangement the emptying means preferably include a pivotally arranged bottom of the metering chamber. According to another alternative arrangement the emptying means may include tipping means for the metering chamber. Irrespective of the particular form of the emptying means, these emptying means are preferably adapted to be controlled by the control unit.

The system in a further advantageous arrangement may have the dosing device comprise a first sensor means for detecting the amount of coffee beans in the metering chamber. The first sensor means may thereby generate a signal when a predetermined amount of coffee beans are detected that corresponds to a certain level in the metering chamber. Such first sensor means may further be arranged in a position relative to the metering chamber that can be adjusted to vary the amount of beans in the metering chamber that will be detected by the first sensor means.

In the system according to the invention the motive means for drivingly engaging the coupling means of the cartridge may include a driving means and the control unit may control the driving means for driving at least one of the relatively movable closing means and the conveyor means by means of a drive shaft. The system according to the invention may also have its first sensor means connected to the control unit, and its control unit arranged to control the driving means in response to a signal form the first sensor means. In such an arrangement it is preferred when the control unit is also arranged to control the driving means to stop upon detection of a predetermined amount of coffee beans by the first sensor means. In particular it is then of further advantage when the control unit is arranged to effect a short reverse rotation of the driving means, prior to interrupting the drive, to ensure that no bean is interfering with the exit opening. Reverse rotation ensures that no beans can be in a position to obstruct closure of the exit opening.

It is further advantageous for a system according to the invention when the control unit is arranged to start operation of the grinding mechanism only upon verifying occurrence of at least one of the relatively movable closing means having closed the exit passage or rotation of the conveyor means having interrupted. In this regard rotation of the conveyor means may also be detected as to rotational speed, as well as phase of both the driving shaft of the brewing apparatus and the driven disc of the cartridge. The relevant occurrence can be verified by a second sensor means. Such additional verifications may increase the reliability of the operation of the system.

In addition thereto the grinding mechanism may be adapted to receive a metered amount of coffee beans from the dosing device. There is an advantage in metering unground beans as opposed to ground coffee in that coffee oil and dust particles are less likely to contaminate the metering chamber. Thereby complete removal of remnants can be enhanced. In this regard it is also beneficial when the grinding mechanism, under control of the control unit, is adapted to be emptied automatically after the coffee beverage is prepared.

The metering chamber of the dosing device for receiving the portion of coffee beans may conveniently include any one of a weighting unit, a bean counting unit and a volume level detection unit. These units can be arranged to communicate with the control unit to initiate control of the drive means. It is also possible to use more than one of these measuring principles in combination to check the individual determinations against one another to increase accuracy.

The system according to the invention may preferably have its control unit arranged to additionally control the grinding mechanism.

The system for preparing coffee beverages, may further be provided with a coffee brewing apparatus including a grinding mechanism for grinding coffee beans for obtaining ground coffee, means for dosing coffee beans, and a disconnectable coffee bean packaging cartridge as defined above wherein the coffee brewing apparatus comprises a coffee bean entrance for supplying the coffee beans from the coffee bean packaging cartridge to the grinding mechanism, and connecting means for removably connecting the coffee bean packaging cartridge to the coffee beverage system. A control unit may further be arranged to control the brewing apparatus. The coffee brewing apparatus is preferably arranged for brewing the coffee beverages by supplying water for extraction to the ground coffee, and a coffee beverage outlet for delivering the coffee beverages. In particular such a system would benefit from further including detecting means for recognizing presence of a cartridge. Such a feature may not only prevent improper operation of the system, but may also instruct a control unit to set parameter for the brewing process in accordance with the coffee bean variety in the cartridge. The detecting means are preferably arranged to register a unique cartridge identifier and a number of times the cartridge has supplied a serving of coffee beans.

It is generally also advantageous for the system when the means for dosing coffee beans comprises a dosing device, while the connecting means for connecting the coffee bean packaging cartridge to the apparatus, is arranged so that the coffee bean exit and the coffee bean entrance can be connected, and wherein the dosing device is provided with a metering system with a metering chamber that is arranged for metering one predefined amount coffee beans from the coffee bean exit to the metering chamber. The dosing device advantageously includes a dosing detection sensor arranged to initiate closure of at least one of the relatively movable closing means of the cartridge and a coffee bean entrance of the apparatus.

The system may also include a motive means such as e drive motor that is arranged for driving the movable conveyor means associated with the exit passage of the cartridge exteriorly of its closure member. Thereby indexing means may be provided that are adapted to move the movable closing means of the cartridge to enable selective closure of the exit passage of the cartridge. Coffee beans both may also be half coffee beans. The beans may be roasted coffee beans wherein preferably the beans are roasted in a well known manner to form the roasted beans.

Further advantageous aspects of the invention will become clear from the appended description of preferred embodiments.

BRIEF DESCRIPTION OF THE DRAWINGS

The invention will now be described in reference to the accompanying drawings, in which:

FIG. 2A shows in cross-section a first embodiment of a coffee bean packaging cartridge in its not yet activated position;

FIG. 2B shows the coffee bean cartridge of FIG. 2A in its activated position;

FIG. 2C shows the component of the coffee bean cartridge of FIGS. 2A and 2B in half and in an exploded arrangement, FIG. 2D is a perspective view of the coffee bean cartridge of the first embodiment in a condition prior to use;

FIG. 3A is a cross-section of a second embodiment of the coffee bean packaging cartridge in its condition prior to use;

FIG. 3B is a cross-section similar to FIG. 3A, but with the coffee bean cartridge having been activated for use;

FIG. 3C shows the component of the coffee bean cartridge of FIGS. 3A and 3B in half and in an exploded arrangement;

FIG. 3D is a perspective view of the second embodiment in a condition ready for use;

FIG. 5A is a cross-section showing a fourth embodiment of the coffee bean packaging cartridge in its closed position prior to use;

FIG. 5B is a cross-section similar to FIG. 5A but with the bean cartridge in an opened condition ready for use;

DETAILED DESCRIPTION OF EXEMPLARY EMBODIMENTS

Figure 1:
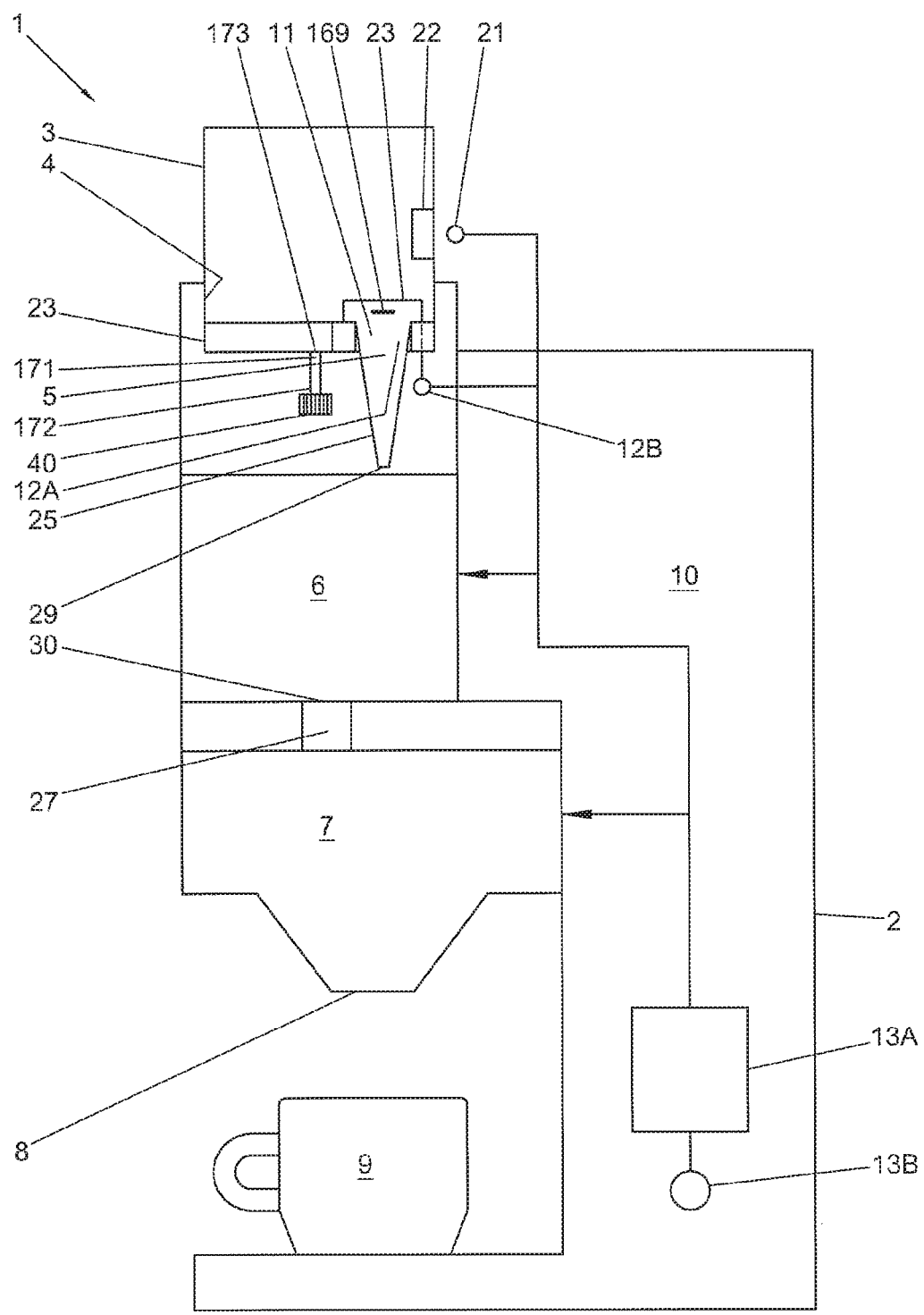
FIG. 1 is a schematic side view of a system for dosing and grinding coffee beans, and for preparing coffee beverages therewith.

In FIG. 1 a system 1 for preparing coffee beverages is shown. The system 1 includes a coffee brewing apparatus 2 and a coffee bean packaging cartridge 3. Connecting means 4 are provided for removably connecting the coffee bean packaging cartridge 3 to the coffee brewing apparatus 2. The coffee bean packaging cartridge 3 defines an inner space for containing coffee beans. These coffee beans are roasted and include generally roasted half beans. Preferably the coffee beans packaging cartridge 3 is closed airtight and/or under vacuum before it is placed on the coffee brewing apparatus 2. Also the coffee bean packaging cartridge 3 can be in the form of a disposable packaging, so that it can be thrown away after it has been emptied.

The connecting means 4 forms an interface between coffee bean packaging cartridge 3 and a coffee bean inlet 5 of the coffee brewing apparatus 2. As will be discussed later such connection means may comprise a bayonet connecting members of the cartridge cooperating with corresponding members of the coffee brewing machine. Both machine and cartridge comprise (part of) the connection means in that example.

A coffee bean exit opening 11 of the coffee bean packaging 3 is in register with a movable closing means 12A in the coffee bean inlet 5 of coffee brewing apparatus 2. The closing means 12A may for example be operated by an electromagnetic closing mechanism 12B. The electromagnetic closing mechanism 12B is controlled by a control device unit 13A. The control device unit 13A can be activated and/or adjusted by an actuation control element 13B.

The system is further provided with a dosing device 23 for transporting a predetermined amount of coffee beans from the cartridge 3 into the coffee brewing apparatus 2. The coffee beans leave the cartridge via the exit opening 11 and enter the coffee brewing apparatus via the coffee bean inlet 5. This dosing device 23 may be part of the coffee brewing apparatus 2 or part of the cartridge 3. It may also be that the dosing device is formed in combination by a portion of the coffee brewing apparatus 2 and a portion of the cartridge 3. Therefore in FIG. 1 the dosing device is schematically shown by means of dotted lines. The coffee brewing apparatus 3 is further provided with a grinding mechanism 6 for grinding coffee beans which are transported from the cartridge 3 into the coffee brewing apparatus 2. A coffee bean transport path 25 extends between the coffee bean inlet 5 and an coffee bean supply opening 29 of the grinder mechanism 6. The grinding mechanism 6 supplies ground coffee to a coffee brewing device 7. A ground coffee transport path 27 extends between a ground coffee exit opening 30 of the grinding mechanism 6 and the coffee beverage brewing device 7. The coffee brewing device 7 is arranged to receive a supply of water to extract a coffee beverage from the ground coffee. The coffee beverage is discharged from a coffee beverage exit 8 from the coffee brewing apparatus into a cup 9 or like household receptacle. A water supply 10 can be arranged to supply water to the coffee brewing device 7 under pressure for espresso type coffee beverages or may provide a drip feed to the extraction system formed by coffee brewing device 7.

In this example the cartridge may be provided with a coupling means 171 adapted for drivingly coupling a conveyor means of the cartridge to rotating motive means 40 of the coffee brewing apparatus. Possible embodiments of the conveyor means will be discussed on the bases of FIGS. 2-5. The conveyor means 169 (schematically shown in FIG. 1) are adapted to be rotatably driven exteriorly of the cartridge for transporting the coffee beans towards the coffee bean exit opening 11 of the cartridge 3. The conveyor means thus forms part of the dosing device 23.

In this example the coupling means 171 comprises a driving hub 171 being attached to the bean conveyor means 169 and extending through a central opening 173 in the bottom 151 of the cartridge 3. The driving hub 171 can be coupled to and rotated by a drive shaft 172 extending from or into the beverage system 1 and which can be rotated by means of motive means 40 as shown in FIG. 1.

In this embodiment the control device unit 13A is connected to a second sensor 21 acting as a detection means for detecting an identification element 22 such as a barcode or a RFID label of the coffee bean packaging cartridge 3. Thereby the control device unit 13A cannot only detect the presence or removal of the coffee bean cartridge 3, but also receive information about its contents and/or a identifier which identifies the cartridge 3. Preferably the control unit 13A controls the grinder mechanism 6, the coffee brewing device 7, the water supply means 10, closing mechanism 12B and/or the dosing device 23 in dependence on the identifier was is read by means of the second sensor 21.

The control unit 13A is thus further arranged to control the grinding mechanism 6 and the water supply to the coffee brewing device 7. It thus becomes possible for the control device unit 13A to adjust the grinding and brewing process in accordance with the particular coffee bean product offered by the cartridge 3. Such information can be supplied to the control unit 13A by the identification element 22.

Referring to FIG. 2A to 2D there is shown a first embodiment of coffee bean cartridge 103. The coffee bean cartridge 103 includes a bottle-like container 131 and a closure member 133. The closure member 133 is provided with an exit opening defining a coffee bean outlet 111 for cooperation with a beverage system, such as disclosed in reference to FIG. 1. The container 131 defines an interior volume 135 and a neck portion 137 bounding a neck opening 139 to the container 131. The neck portion 137 includes a cylindrical inner sleeve 141 and a cylindrical outer sleeve 143, defining an annular groove 145 there between. The outer cylindrical sleeve 143 is provided with an outer male screw thread 147. Between the outer cylindrical sleeve 143 and the major portion of the container 131 there is provided a radially extending annular ridge 149.

The closure member 133 includes a substantially planar bottom 151 and a circumferential outer wall 153. The circumferential outer wall 153 is provided with a circumferential tear strip 155 that is connected to the outer wall 153 by a circumferential line of weakening 157. The tear strip 155 is further provided with a pull tab 159 that can be manually gripped.

The closure member 133 further includes a first cylindrical inner wall 161 and a second inner cylindrical wall 163 concentrically between the inner cylindrical wall 161 and the circumferential outer wall 153. The second inner cylindrical wall 163 is slightly lower than the circumferential outer wall 153, but higher than the first inner cylindrical wall 161. As best seen in FIG. 2C, the second inner cylindrical wall 163 has a female screw thread 165 on an inner surface thereof adapted to cooperate with the male screw thread 147 of the container neck portion 137. The first inner cylindrical wall 161 is provided with a perimeter aperture 167 in its inner surface that is in communication with the coffee bean outlet 111. The perimeter aperture 167 is in communication with the coffee bean outlet 111 by a cavity that is radially outwardly offset with respect to column of coffee beans above the bottom 151 of the cartridge. This arrangement prevents the coffee beans from finding their way to the bean outlet 111 in an uncontrolled manner.

Within a chamber defined by the bottom 151 of the closure member 133 and the first inner cylindrical wall 161, a bean conveyor means embodied as a conveyor disc 169 is rotatably arranged. The cartridge is provided with a coupling means 171 adapted for drivingly coupling the conveyor means 169 to rotating motive means 40 of the coffee brewing apparatus. In this example the coupling means comprises a driving hub 171 being attached to the bean conveyor disc and extending through a central opening 173 in the bottom 151. The driving hub 171 can be coupled to and rotated by a drive shaft 172 extending from the beverage system 1 of FIG. 1 and which can be rotated by means of the motive means 40 as shown in FIG. 1. While such drive shafts and their connections are well known to the skilled person, no further explanation is deemed necessary. The conveyor disc 169 is further provided with a closing flap 175 on its outer periphery for closing the perimeter aperture 167 in at least one rotational position. The closing flap 175 embodies relatively movable closing means. The driving hub 171 may further be provided with an axially and upwardly extending piercing pin 177. Further the conveyor disc may be given a upwardly convex shape to assist in conveying the coffee beans towards the periphery of the conveyor disc. Such a shape, however, is optional and other suitable forms are conceivable as well. For the closing flap 175 to close the perimeter aperture 167 it is merely necessary to prevent the passage of coffee beans, which may already be achieved when the perimeter aperture 167 is only partly blocked by the flap 175. However to be able to take the bean cartridge from the apparatus for an interval of time, it is preferred that the closure of the aperture 167 by the flap 175, at least to some extent, delays deterioration of the remaining coffee bean contents. Hence the flap forms part of the closing member 133 wherein the closure member has relatively movable closing means in the form of the flap for selectively opening and closing the exit opening by means of closing the aperture 167, wherein in the closed condition it is prevented that the coffee beans escape from the cartridge and preferably it is counteracted that content of the coffee bean in the form of gasses escape to surrounding air.

Further, as best seen again in FIG. 2C, the second inner cylindrical wall 163 is provided with an inner peripheral ridge 179 on its free end. The open end 139 of the neck portion 137 of the container 131 may be closed by a sealing means formed by sealing membrane 181. Further, as best seen in FIG. 2D, the closure member 133 may be provided with radially extending bayonet elements 183, 185 for connecting it to the coffee brewing apparatus 2 of FIG. 1. Hence the bayonet elements form part of connecting means for connecting the cartridge to the coffee brewing apparatus. The skilled person will understand that any conceivable means, other than a bayonet type connection (such as 183, 185), may be suitable as connecting means for connecting the cartridge 103 to a coffee brewing apparatus 2 as shown in FIG. 1.

Reverting now to FIGS. 2A and 2B there are shown two axial positions of the closure member 133 with respect to the container 131. In FIG. 2A the cartridge 103 is shown in a condition in which it is supplied to a user. In this condition of purchase the interior volume 135 will be completely filled with roasted coffee beans of a selected variety. The properties of such a contents may be communicated by an identification element 22 attached to the exterior of cartridge 103 as described in reference to FIG. 1. The neck opening 139 will be hermetically closed by the sealing membrane 181 to protect the contents of the container 131 from deterioration by ambient air. The sealing membrane 181 is attached, preferably only to the outer cylindrical sleeve 143. When a user wants to bring the cartridge 103 into a condition of use, as shown in FIG. 2B, the tear strip 155 should first be removed by gripping the pull tab 159. Through the line of weakening 157 the tear strip 155 can be completely removed from the closing member 133. This can be done with the cartridge 103 already connected to the coffee brewing apparatus 2. With the tear strip 155 removed, the container 131 can be rotated with respect to the closure member 133. Such rotation, i.e. in a clock wise direction, has the effect that the male and female screw thread 147, 165 act together to move the container 131 and closure member 132 closer together in an axial direction. By this axial movement the piercing pin 177 may penetrate the sealing membrane 181 and allow it to tear across the opening 139, while the first inner cylindrical wall 161 pushes it into the annular groove 145 of the neck portion 137 as shown in FIG. 2B. This movement of the sealing membrane 181 by the means for disrupting and displacing embodied by the first inner cylindrical wall 161 is assisted by attachment of its perimeter to only the outer cylindrical sleeve 143. It may further be beneficial to prepare the sealing membrane 181 to tear open along predefined tear lines. Such predefined tear lines can be conveniently created by partial laser cutting of the sealing membrane foil. Removal of the sealing membrane 181 allows the coffee beans to be gravity fed onto the conveyor disc 169. With the cartridge 103 thus having been activated to the condition of use, as shown in FIG. 2B, and connected to the brewing apparatus of FIG. 1, the control unit 13A (see FIG. 1) may cause rotation of the conveyer disc 169. During moments of rotation, when the closing flap 175 does not cover the perimeter aperture 167 (see FIG. 2C), coffee beans are conveyed radially outwardly to pass through the coffee bean outlet 111 into for example a metering chamber of the coffee brewing apparatus as will be discussed later, or directly into the grinding mechanism 6.

In case the coffee brewing apparatus is provided with a metering chamber, such metering chamber, conveyer disc and flap in combination form a dosing device. The dosing device includes the metering chamber for receiving a portion of coffee beans corresponding to a dosed amount of coffee beans which is preferably necessary for preparing a single serving of coffee beverage wherein the system is arranged for transporting the coffee beans from the cartridge into the metering chamber. The dosing device may further comprises emptying means for emptying the metering chamber.

In case the beans are transported from the cartridge directly into the grinder mechanism the conveyor means and the flap of the cartridge form the dosing device in combination with a timer of the control unit. In that case the control unit may comprise the timer for transporting during a predetermined length of time coffee beans into the coffee brewing apparatus. In case the amount of coffee beans which are transported per second, in use, are known the total amount of coffee beans which is transported can be predetermined. Hence in such an embodiment the dosing device comprises at least one of the conveyor means and the relatively movable closing means. The control means comprises timing means wherein the control unit is arranged such that, in use, the control unit operates the motive means a predetermined length in time for transporting a predetermined amount of coffee beans from the cartridge into the coffee brewing apparatus wherein preferably the predetermined amount of coffee beans corresponds with a dosed amount of coffee beans for preparing a drink.

The skilled person will readily understand that in variations of the brewing apparatus the metering chamber may alternatively be positioned downstream of the grinding mechanism 6. In the latter case, the coffee beans will directly enter the grinding mechanism from the cartridge bean outlet 111.

It is further seen that in the activated condition shown in FIG. 2B, the inner peripheral ridge 179 has snap-fitted behind the radially extending annular ridge 149 of the container neck portion 137. In this position also the male and female screw threads 147,165 have completely disengaged. It is thereby prevented that the container 131 and closure member 133 are accidentally moved back to the position of FIG. 2A. There is thereby also a clear distinction between cartridges that are still fresh and unused, as opposed to cartridges that have been activated for use on a coffee brewing apparatus. FIGS. 2A-2D thus show a first embodiment of coffee bean packaging, with a closure cap 133, provided with conveyor disc 169, and a sealing membrane 181 directly on the bottle-like container 131. Upon removal of a tamper evident tear strip 155, with the cartridge 103 already connected to the system, the packaging cartridge can be manually activated by rotation (180 degrees). The seal, which can be a laser pre-cut foil, tears open in a controlled manner when activating and is pushed out of the way into a groove 145 in a ring of the bottle. At the end of its movement an inner ring 163 of the closure cap 133 snaps over a thick edge, formed by annular ridge 149, of the bottle, and can no longer be removed therefrom because the screw threads 147, 165 have disengaged. Reverse unscrewing is thereby inhibited.

FIGS. 3A to 3D show a second embodiment of a coffee bean cartridge 203 that again includes a container 231 and a closure member 233. The closure member 233 has an annular bottom 251, provided with a bean outlet 211. The annular bottom 251 defines a central bore 254 for the accommodation of a relatively movable auxiliary closure member 256. The bottle-like container 231 defines an interior volume 235 and a neck portion 237 defining an opening 239 on one end of the container 231. Similar to the first embodiment, the neck portion 237 is composed of concentrically arranged inner and outer cylindrical sleeves 241, 243 to define annular groove 245 there between. As the open end 239 of the container 231 is again sealed by a sealing membrane 281, the annular groove 245 is again serving to collect the sealing membrane 281 upon its removal from the opening 239. Again the sealing membrane 281 is preferably attached with its outer periphery to only the outer cylindrical sleeve 243.

The closure member 233 is further provided with a first inner cylindrical wall 261 and a second inner cylindrical wall 263. The second inner cylindrical wall has an inner peripheral ridge 279 at its upper free end. The closure member 233 is connected to the container 231 by the inner peripheral ridge 279 snap-fitting onto a radially extending annular ridge 249 on the neck portion 237 of container 231. The snap-fit connection is such that it cannot be easily disconnected and thereby prevents the closure member 233 to be accidentally removed from the container 231. Further, the closure member 233 includes within its central bore 254 a perimeter aperture 267 in its first inner cylindrical wall 261 giving radial access to a cavity in communication with the axially arranged coffee bean outlet 211. Again the cavity between the radial perimeter aperture 267 and the axial bean outlet 211 is offset with respect to the column of coffee beans, or particles, within the cartridge 203 to allow control over the beans, or particles, that find their way to the outlet 211. On its inner cylindrical wall 263 the closure member 233 also is provided with female screw thread formations 265 to cooperate with male screw thread formations 247 on an annular outer wall 262 on the auxiliary closure member 256. The auxiliary closure member is generally formed as a cup-like element having a bean conveyor means in the form of conveyor disc 269 at its bottom and a cylindrical perimeter wall 264. The cylindrical perimeter wall 264 carries the annular outer wall 262, so as to form an upwardly open perimeter groove 266 for a purpose to be described later. The auxiliary closure member 256 is further provided with a driving hub 271 for coupling with a drive shaft of a beverage preparing apparatus and forming coupling means (not shown, but conventional). The driving hub 271 can also be provided with a piercing pin to engage and puncture the sealing membrane 281. The cylindrical perimeter wall 264 of the auxiliary closure member 256 is further provided with a number, like three of four, perimeter windows 274A, 274B, 274C, adapted to align with the perimeter aperture 267. The perimeter windows 274A, 274B, 274C are spaced from one another by interrupting wall sections, which thereby represent the movable closing means.

In use, the cartridge 203 will be provided to the end user in a condition illustrated in FIG. 3A, with the sealing membrane 281 fully intact and protecting the contents in the interior volume 235. The auxiliary closure member 256 is partially projecting from the opening 254 in bottom 251. To activate the cartridge 203 for use it is simply connected to the coffee brewing apparatus 2 (FIG. 1) by connecting means configured as bayonet elements 283, 285 projecting laterally from the closure member 233. The driving hub 271 will engage a resiliently mounted drive shaft in the apparatus and will push this resiliently into a retracted position. Upon operation of the brewing apparatus 2 through actuating element 13B (see FIG. 1) the drive shaft (not shown, but conventional) will rotate the auxiliary closure member 256 which will thereby move upwardly by the male and female screw thread formations 247, 265 to the position shown in FIG. 3B. The drive shaft (not shown) will be resiliently biased to follow the driving hub 271 and remain in engagement therewith. When the auxiliary closure member 256 has reached its uppermost position as shown in FIG. 3B the screw thread formations 247, 265 will have disengaged and not allow reverse movement of the auxiliary closure member 256 to the position of FIG. 3A. During movement of the auxiliary closure member 256 from the inactive position of FIG. 3A to the activated position of FIG. 3, the piercing pin 277 and the perimeter wall 264 of the auxiliary member 256 has pushed the sealing membrane 281 aside into the annular groove 254 provided in the neck portion 237 of the container 231. The piercing pin 277 and the perimeter wall 264 thereby form a means for disrupting and displacing the sealing element. By gravity the coffee beans can now be fed on to the conveyor disc 269 and be conveyed to the perimeter aperture through any one of perimeter windows 274 A, B or C, as these align during rotation. Once the dosing device 23 and/or the control unit 13A (of FIG. 1) has determined that dosing is sufficient, the rotation of the auxiliary member 256 and thereby its conveyor disc 269 will be interrupted. Thereby a means to interrupt the supply of beans is provided. The operating mechanism of the brewing apparatus 2 (FIG. 1) ensures that rotation of the auxiliary member 256 is always with a section of the perimeter wall 264 between two adjacent ones of the perimeter windows 274A, B, C in overlap with the perimeter aperture 267. Not only does this prevent any further transport of coffee beans through the coffee bean outlet 211, but it also protects the contents of the container 231 from contact with the ambient environment. It is conceivable and preferred that the cartridge 203 in its activated condition of FIG. 3B can be safely removed from the brewing apparatus. This may be desirable to allow intermediate use of a cartridge with a different quality of variety of coffee beans, to enable variation of the brewed beverage.

One noticeable difference of the coffee bean packaging cartridge according to the second embodiment, with that of the first embodiment, is that its conveyor disc is integral with a part of the closure member. Conceivably in another variation the entire bean packaging cartridge could rotate together with the conveyor disc.

A third embodiment of a coffee bean packaging cartridge 303 is shown in FIGS. 4A to 4D. The coffee bean cartridge 303 again includes a bottle-like container 331 and a closure member 333. The closure member 333 at a bottom 351 thereof is provided with a coffee bean outlet 311, for cooperation with the brewing apparatus 2, shown in FIG. 1. The container defines an interior volume 335 which will be filled with coffee beans (not shown but conventional). The container 331 is further provided with a neck portion 337 defining a neck opening 339. The neck opening 339 defines an open end of the container 331 and is bounded by an inner cylindrical sleeve 341 and a concentrically arranged outer cylindrical sleeve 343. Formed between the inner and outer cylindrical sleeves 341, 343 is again an annular groove 345. As such, the container 331 of the third embodiment 303 is substantially similar to the containers of the first and second embodiments, without being strictly identical.

The neck portion 337 is provided with a radially extending annular ridge 350 extending from the outer cylindrical sleeve 143 at a location adjacent its free end.

The closure member 333 includes a circumferential outer wall 353 which projects axially from its bottom 352. Also projecting axially from the bottom 351 is a first inner cylindrical wall 361 and a second inner cylindrical wall 363 concentrically between the first inner cylindrical wall 361 and the circumferential outer wall 353. The second inner cylindrical wall 363 is provided with an inwardly projecting peripheral ridge 379 for snap-fittingly engaging the radially extending annular ridge 350 to attach the closure member 333 to the container 331.

Figure 4B:
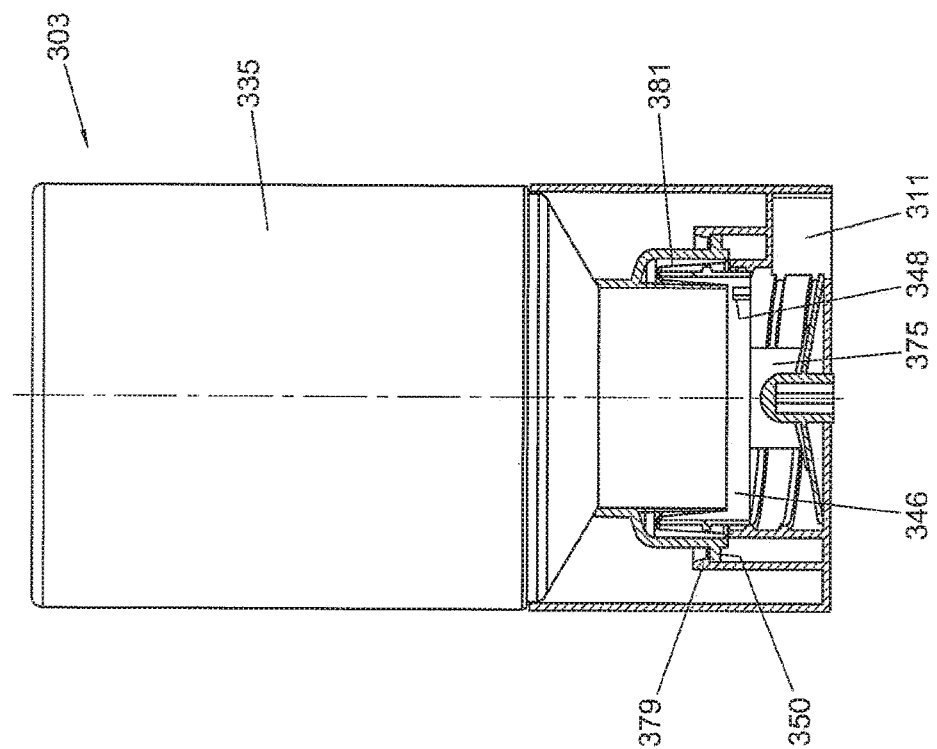
FIG. 4B is a cross-section similar to FIG. 4A but with the bean cartridge activated for use.
Figure 4A:
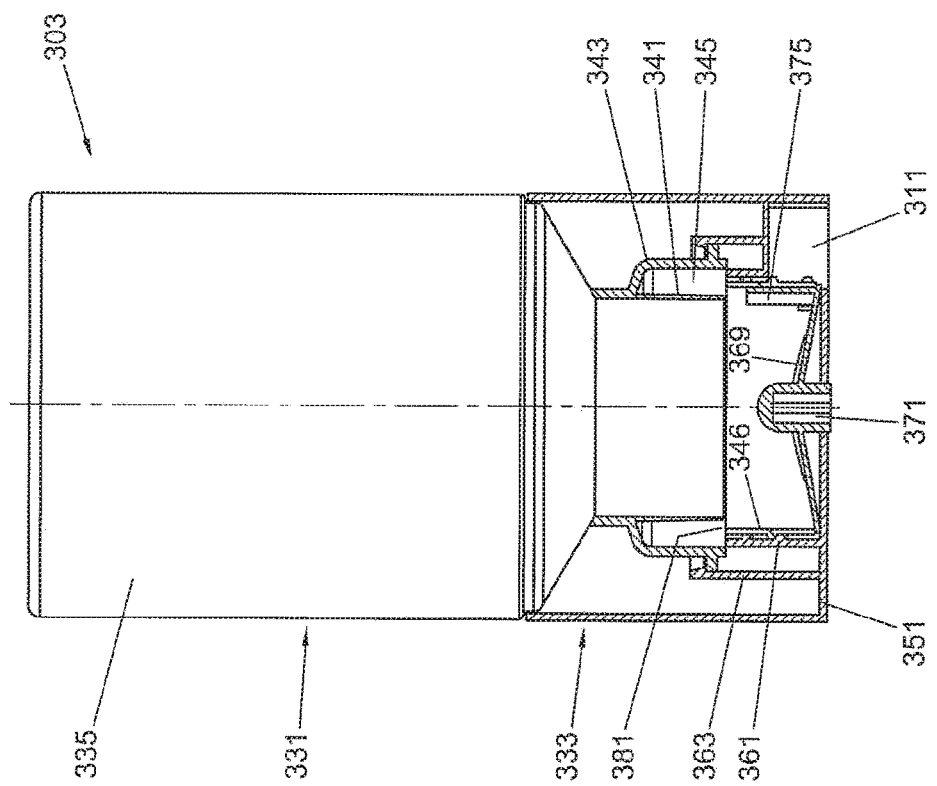
FIG. 4A is a cross-section through a third embodiment of coffee bean packaging cartridge in a condition prior to use.
Figures 4C, 4D:
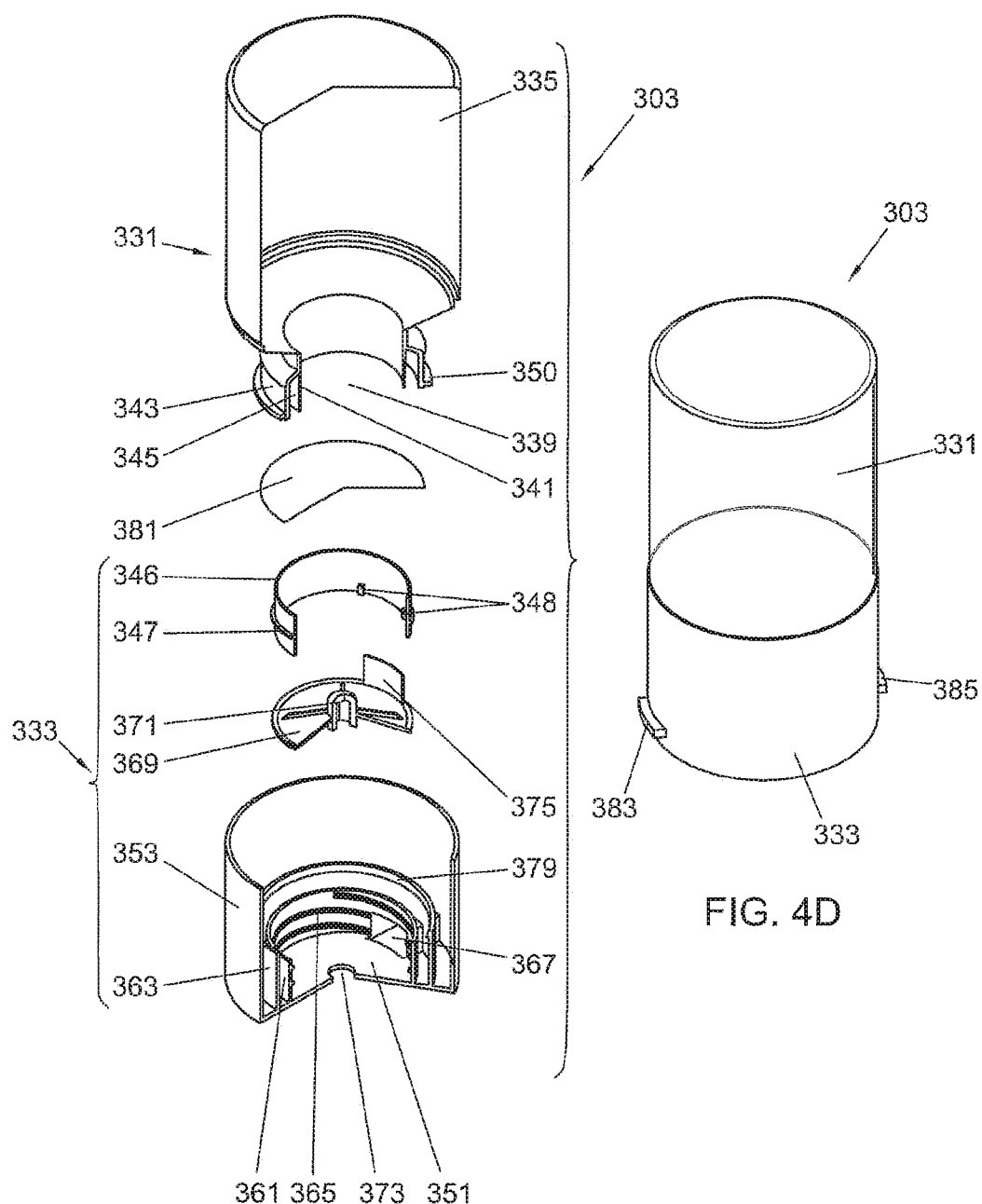
FIG. 4C is an exploded view of the components of the third embodiment of the bean cartridge, shown in half.
FIG. 4D is a perspective view of the third embodiment of the bean cartridge in its assembled form.

Rotatably received on the bottom 351 is a bean conveyor disc 369 that has a driving hub 371 that can be drivingly engaged through central opening 373 in the bottom 351. The rotatable bean conveyor disc 369 includes an upstanding closing flap 375 for closing a perimeter aperture 367 in the first cylindrical inner wall 361. The perimeter aperture 367 communicates with the bean outlet 311 via a cavity that is offset with respect to column of coffee beans within the interior volume 335, for a purpose already explained. The closing flap 375 functions as the movable closing means. As seen in FIG. 4C the conveyor disc 369 may be provided, as part of the conveyor means and guiding means, with a number of radially extending ridges in addition to an upwardly convex shape. These features, which are optional, may be employed to assist conveyance of the coffee beans towards the periphery of the conveyor disc 369 by forming an agitating and guiding means for the coffee beans. In an alternative arrangement the rotatable bean conveyor may be formed by a paddle wheel with radially extending paddles or vanes. To prevent bean jamming it may be advantageous not to have these paddles or vanes extend the entire radial distance to the perimeter edge of the paddle wheel or impeller. Alternatively or additionally the vanes may be formed in a flexible material. More in particular the entire impeller may be made from an elastic material, in particular in a plastic material having an E-modulus in the range of 150 to 1200 N/mm$^2$, more in particular 175 to 800 N/mm$^2$, and preferably between 175 and 300 N/mm$^2$. Further it is possible to vary the number of vanes in relation to the area of the perimeter aperture to block the escape of beans with the impeller at rest.

Surrounding the bean conveyor disc 369, coextensive with the first cylindrical inner wall 361, is a movable sleeve 346. The movable sleeve is provided on its exterior with a male screw thread 347, which engages a female screw thread formation on an interior surface of the first cylindrical inner wall 361. The movable sleeve 346 is further provided with inwardly projecting notches, which each engage one of the opposite upstanding sides of closing flap 375.

In operation, the bean cartridge 303 will be connected to a coffee brewing machine (such as apparatus 2 by connecting means 4 as shown in FIG. 1) by means of bayonet formation 383, 385. To activate the cartridge the coffee brewing machine initiates a control signal to drive the driving hub 371 and thereby the conveyor disc 369 and upstanding closing flap 375. The closing flap 375 will thereby engage a relevant one of the notches 348 to move the movable sleeve 346 along the engaged screw thread formations 347, 365 in an upward direction towards a sealing membrane 381 that is attached with its periphery to the outer cylindrical sleeve 343 of container 331 and thereby forming the sealing means. This movement will rupture the sealing membrane 381 and push it into the annular groove 345. Thereby the movable sleeve 346 forms a means for disrupting and displacing the sealing element. In particular the sealing membrane 381 may have been prepared to tear open along predefined weakened lines. Once the upward movement of the movable sleeve 346 is completed the notch 348 engaged by the closing flap will disengage therefrom as best shown in FIG. 4B. It will be clear to the skilled person that for activating the cartridge 303 it will only be necessary to provide a single notch 348 on the inner circumference of movable sleeve 346. In this third embodiment the second notch engaging a trailing vertical edge of closing flap 375 is merely provided for ease of assembling.

The second and third embodiments as described above can both be automatically activated by a driving means in of the system. Continued rotation of the driving hub will start conveyance of the coffee beans once the sealing membrane has been moved out of the way of the container opening.

FIG. 5A to 5E show a fourth embodiment of coffee bean packaging container 403. Packaging cartridge 403 includes a bottle-like container 431 defines an interior volume 435, and has a neck portion 437 and an outer collar 442. Received within an open end 439 defined by the outer collar 442 is a closure member 433, which preferably is non-detachably attached to the container 431. The outer circumference of the outer collar 442 may be provided with bayonet formations 483, 485 or other suitable connecting means for connection to a coffee brewing apparatus such as apparatus 2 and connecting means 4 of FIG. 1.

Figures 5C, 5D:
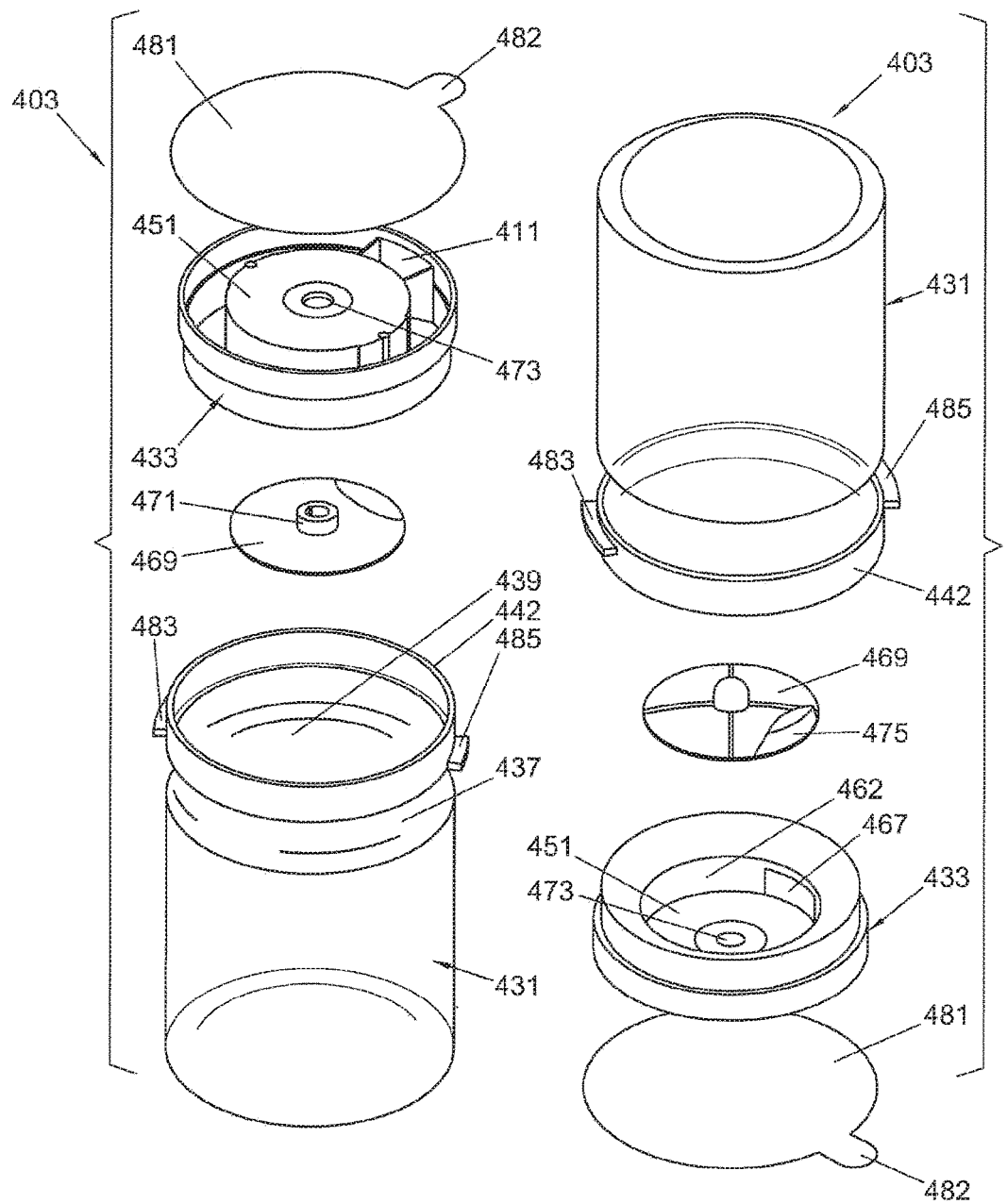
FIG. 5C is a first perspective exploded view of the fourth embodiment of the bean cartridge showing the parts in an inversed arrangement.
FIG. 5D is a second perspective exploded view of the fourth embodiment in an arrangement normal to the position of use.
Figure 5E:
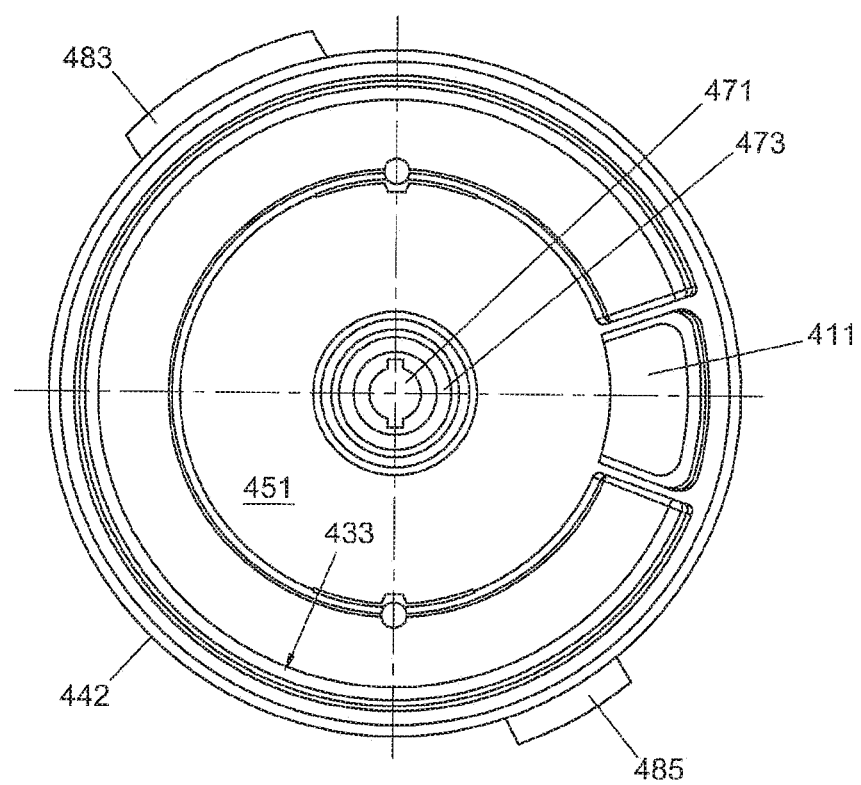
FIG. 5E is a bottom view of the fourth embodiment of the bean cartridge with its sealing membrane removed.

The closure member 433 fits snugly into the open end 439 as defined by the neck 437 and outer collar 442 of the container 431 and may be attached by adhesive or weld bonding. An axial outer edge of the closure member 433 is slightly recessed from the outer axial edge of the outer collar 442 as shown in FIGS. 5A and 5B. The closure member 433 also has a bottom 451 with a coffee bean outlet 411. As best seen in FIGS. 5C and 5D, the closure member 433 defines a central cavity wall 462 with a perimeter aperture 467. The perimeter aperture communicates with the coffee bean outlet 411 via a cavity that is again radially offset from the column of coffee beans held in the interior volume 435. Received in a central cavity defined by cavity wall 462 and bottom 451 is a rotatable bean conveyor disc 469. Axially extending from the conveyor disc 469 is a closing flap 475 configured to form a movable closing means for the perimeter aperture 467. The bean conveyor disc has a driving hub 471 protruding through a central opening 473 in the bottom 451. It will be clear to the skilled person that conceivably the closure member (433) of this embodiment may also be designed to engage the outside of the container (431), in a similar fashion as in the previously described embodiments. In such an alternative arrangement the bayonet formations (483, 485) will be part of the closure member (433) rather than the container (431).

To protect the bean contents of cartridge 403, prior to its activation for use is a coffee brewing machine, a sealing membrane 481 is hermetically attached to the axial free edge of the outer collar 442. In the fourth embodiment the sealing membrane 481, forming the sealing means, is not automatically removed by the coffee brewing machine but will be removed by the user. For this purpose a manual pull tab 482 may be provided as a configuration of the means for disrupting and displacing the sealing element. The arrangement of the bayonet formations 483, 485 on the exterior of the container 431 with the closure member 433 recessed in its open end allows the barrier foil or sealing membrane 481 to be sealingly attached to the outer edge of the container 431. Thereby the sealing barrier 481 also covers the joint between the container 431 and the closure member 433. The sealing membrane or barrier foil 481 can keep the bean contents fresh and protected from ambient air during shipping and stock keeping prior to the cartridge being put to use. However freshly roasted coffee beans may still emanate gases, such as $CO_2$. To enable roasted beans to be freshly packed the sealing membrane, or barrier foil such as 481, may additionally be provided with a one-way pressure relief venting valve (not shown in the drawing, but conventional).

In operation the cartridge 403 of the fourth embodiment, after manual removal of its sealing membrane 481 can be coupled to the brewing machine 2 of FIG. 1 by the bayonet formations 483, 485 or like suitable connecting means. The operation of conveying coffee beans into the coffee brewing apparatus 2 is similar to the other embodiments. Once the brewing apparatus is activated to produce a coffee brew the control unit 13A initiates rotation of the conveyor disc 469 and the closing flap 475 will rotate away from the perimeter aperture 467. The rotation of conveyor disc 469 will be continuous and the closing flap 475 will only line up with the perimeter aperture 467 once per revolution. During the time that closing flap 475 is not aligned with the perimeter aperture 467, coffee beans may exit towards the coffee bean outlet 411 and into the grinding or metering unit of the brewing machine. As soon as the required amount of coffee beans to be ground is withdrawn from cartridge 403, the bean conveyor disc 469 will stop its rotation in the exact position that the closing flap 475 aligns with the perimeter aperture 467. A means to interrupt the supply of beans is thereby provided. Preferably the rotative power and the sturdiness of the components comprising the closing flap 475 and the perimeter aperture 467 is such that any coffee beans that may be in the way of closing are cut or crushed, so that these do not present an obstacle to the closing of perimeter aperture 467.

Figure 5F:
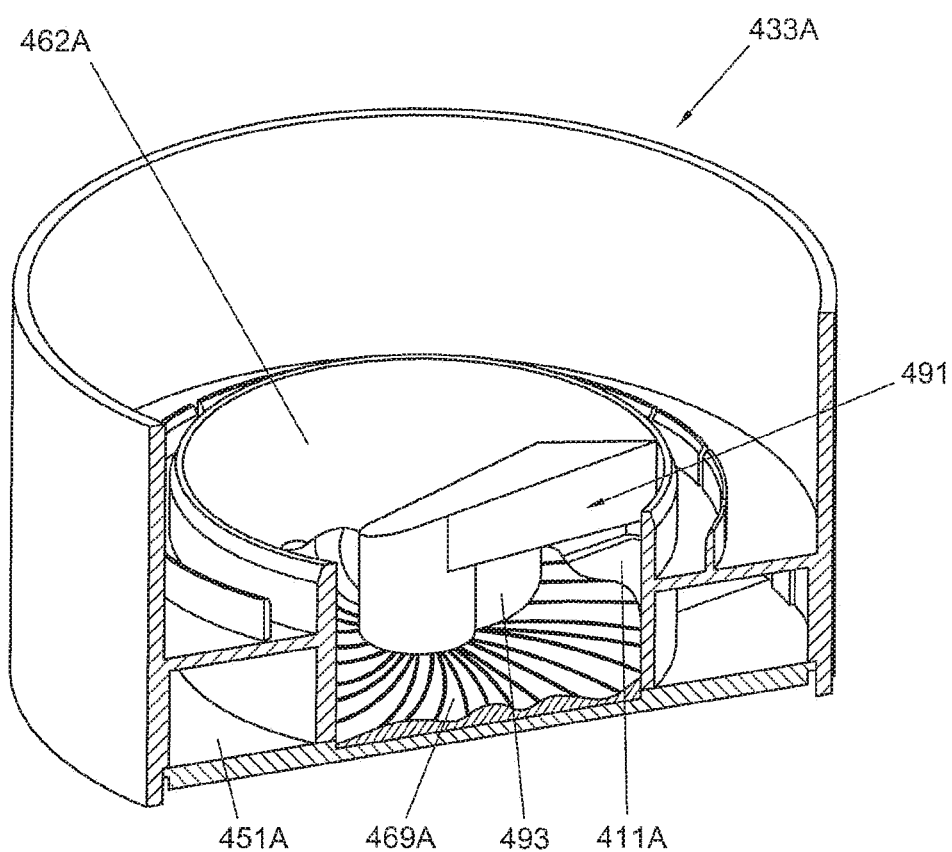
FIG. 5F is a partially cross-sectioned perspective view of a modified closure member for use with the fourth embodiment of bean cartridge.

FIG. 5F shows a modified alternative closure member for use with the bean cartridge of FIGS. 5A to 5D. Closure member 433A of FIG. 5F is adapted to be non-detachably attached to the open end of the container 431 of FIGS. 5A-D. The axial outer edge of the closure member 433A may thereby again be slightly recessed from the outer axial edge of the outer collar of the container 431 as shown in FIGS. 5A and 5B to allow a sealing membrane only to be attached to the axial free edge of the outer collar of the container. The closure member 433A also is provided with a bottom 451A through which a coffee bean outlet 411A extends. The closure member 433A defines a central cavity wall 462A with a perimeter aperture communicating with the coffee bean outlet 411A. Accommodated in the central cavity defined by cavity wall 462A and the bottom 451A is a rotatable bean conveyor disc 469A. guiding means include a plurality of generally radially extending alternating ridges and grooves on an upper surface of the conveyor disc 469A that in use confronts the interior of container 431. The plurality of generally radially extending alternating ridges and grooves of the conveyor disc 469A assist in transporting the coffee beans towards the periphery thereof, by forming an agitating and guiding means for the coffee beans. Alternatively a flat upper surface on the conveyor disc 469A may be used when it is rotated at a higher speed. In addition the guiding means of the embodiment of FIG. 5F includes a stationary guide arm 491 overlying a portion of the upper surface of the conveyor disc 469A to guide coffee beans from the conveyor disc 469A along a generally radially extending guide surface 493 toward the exit opening 411A.

In reference to FIGS. 6 to 10 several metering devices will now be described that are suitable for use in conjunction with the coffee bean cartridges previously described.

Figure 6:
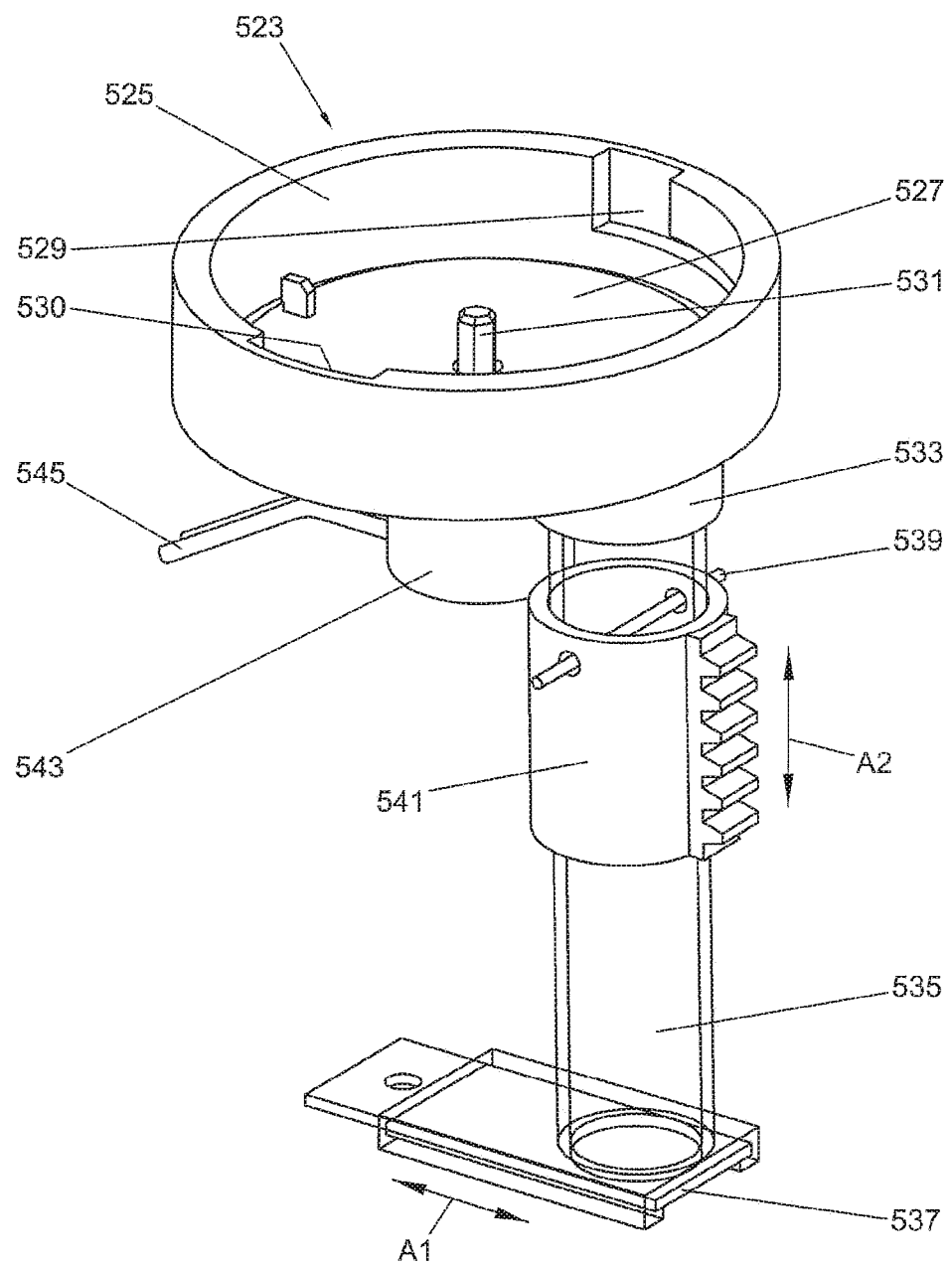
FIG. 6 shows components of a dosing device for metering coffee beans discharged from the packaging cartridge.

In FIG. 6 some principal components of a dosing unit 523, embodying the means for dosing coffee beans, are shown. The dosing unit 523 forms part of the coffee apparatus as shown in FIG. 1 and is positioned within the coffee beans transport path 25. A explained above, the conveyor means of the cartridge also forms part of the dosing device in this embodiment. Hence the dosing unit 523 of the coffee brewing apparatus 2 and the conveyor means of the cartridge 3 in combination form part of the dosing device 23 of the system shown in FIG. 1. A machine interface 525 has a cavity 527 and bayonet formations 529, 530 to cooperate with bayonet formation such as provided on the bean cartridges previously described. Protruding from a bottom of cavity 527 is a rotatable drive shaft 531 for drivingly engaging a driving hub of a conveyor disc of the described cartridges. Also provided in the bottom of cavity 527 is a metering entrance 533, with line up when connected to the machine interface 525.

The metering entrance 533 gives access to a metering chamber, also be referred to as dosing chamber 535. The dosing chamber 535 at a lower end thereof is provided with a movable release lid 537 as a configuration of an emptying means. In the example illustrated the movable release lid 537 is a slidable gate, but it may conceivably also be in the form of a rotatable shutter of like. The release lid 537 may be automatically operated to move in either of two opposite directions as indicated by double headed arrow A1.

The metering chamber, when having a transparent or translucent outer wall as shown in FIG. 6, may be governed by optical sensor detection means 539, also referred to as a first sensor or first sensor means, such as a cooperating light emitting diode (LED) and an infrared (IR) sensor. The optical sensor detection means may be carried on a preferably adjustable detection carrier 541. The detection carrier 541 may have means for its vertical positioning along the height of dosing chamber 535, in accordance with the double headed arrow A2.

It is further seen in FIG. 6 that a drive motor 543 (motive means 40 of FIG. 1) may be directly attached to the underside of the machine interface 525 to drive the rotatable drive shaft 531 (shaft 172 of FIG. 1). Electrical cables 545 are provided to feed motor 543. Drive motor 543 generally embodies the driving or motive means of the system of FIG. 1. The electrical cables 545 may be fed with electrical energy under control of the control unit of the system. The control unit of the system may act in response to the first sensor.

In operation, coffee beans will be discharged via the metering entrance 533 into the dosing chamber 535, by action of the drive shaft 531 driving the bean conveyor disc of any one of the previously described bean packaging cartridges. The sensor detection means 539 in advance will have been positioned at the proper height of the dosing chamber 535, so that the sensor detection means 539 will detect the volume in coffee beans that corresponds to the proper dosage. When interruption of the IR-beam of the optical sensor detection means 539 exceeds a period of time longer than a predetermined time interval this means that the beans permanently block the IR-beam and that thus the level of beans in the chamber has reached the height of the first sensor. In that case this event is communicated to the control unit. The control unit will control the motive means of the coffee apparatus such that conveyor means stop transporting beans form the cartridge into the metering chamber. Also the control unit will operate the motive means such that the drive shaft 531 will return the conveyor disc in the cartridge into a position where it closes the communication with its coffee bean outlet. The movable release lid 537, which has kept close the bottom of the metering chamber 535 can now be commanded by control unit 13A (FIG. 1) to discharge the exact dosing to coffee grinder mechanism 6, wherein the system is provided with a first sensor for measuring the amount of coffee beans that are transported from the cartridge into the coffee brewing apparatus for preparing coffee. It further holds that the first sensor 539 is connected to the control unit 13A wherein the control unit 13A is arranged is arranged to control the motive means 40 to stop upon detection by means of the first sensor of a predetermined amount of coffee beans being transported from the cartridge into the coffee brewing apparatus wherein preferably the predetermined amount of coffee beans corresponds with a dosed amount of coffee beans for preparing a drink. and wherein the control unit is arranged to control the relatively movable closing means (for example the flap 375) to close the exit opening of the cartridge upon detection by means of the first sensor of a predetermined amount of coffee beans being transported from the cartridge into the coffee brewing apparatus wherein preferably the predetermined amount of coffee beans corresponds with a dosed amount of coffee beans for preparing a drink.

It holds that the first sensor means is arranged to detect coffee beans in a selected portion of the metering chamber (in this case the portion of the metering chamber located at the height of the first sensor) wherein the system is arranged to select a portion of the metering chamber wherein coffee beans will be detected by the first sensor means to select an corresponding amount of coffee beans in the metering chamber that will be detected by the first sensor means.

Instead of adapting the distance between the first sensor 539 and a bottom of the metering chamber as discussed above, the metering chamber 535 itself may be varied in volume, such as by telescoping wall sections. Such an arrangement may also be used to eliminate the sensor means 539 and obtain dosing by simply limiting the volume that can be contained in the metering chamber. In this example emptying means include a removable arranged bottom of the metering chamber. Alternatively the emptying means include tipping means for tipping the metering chamber. The emptying means are adapted to be controlled by the control unit 13A. In this example it thus holds that the first sensor means generates a signal when a predetermined amount of coffee beans are detected that corresponds to a certain level in the metering chamber wherein preferably the predetermined amount of coffee beans corresponds with the dosed amount of coffee beans.

Figure 7:
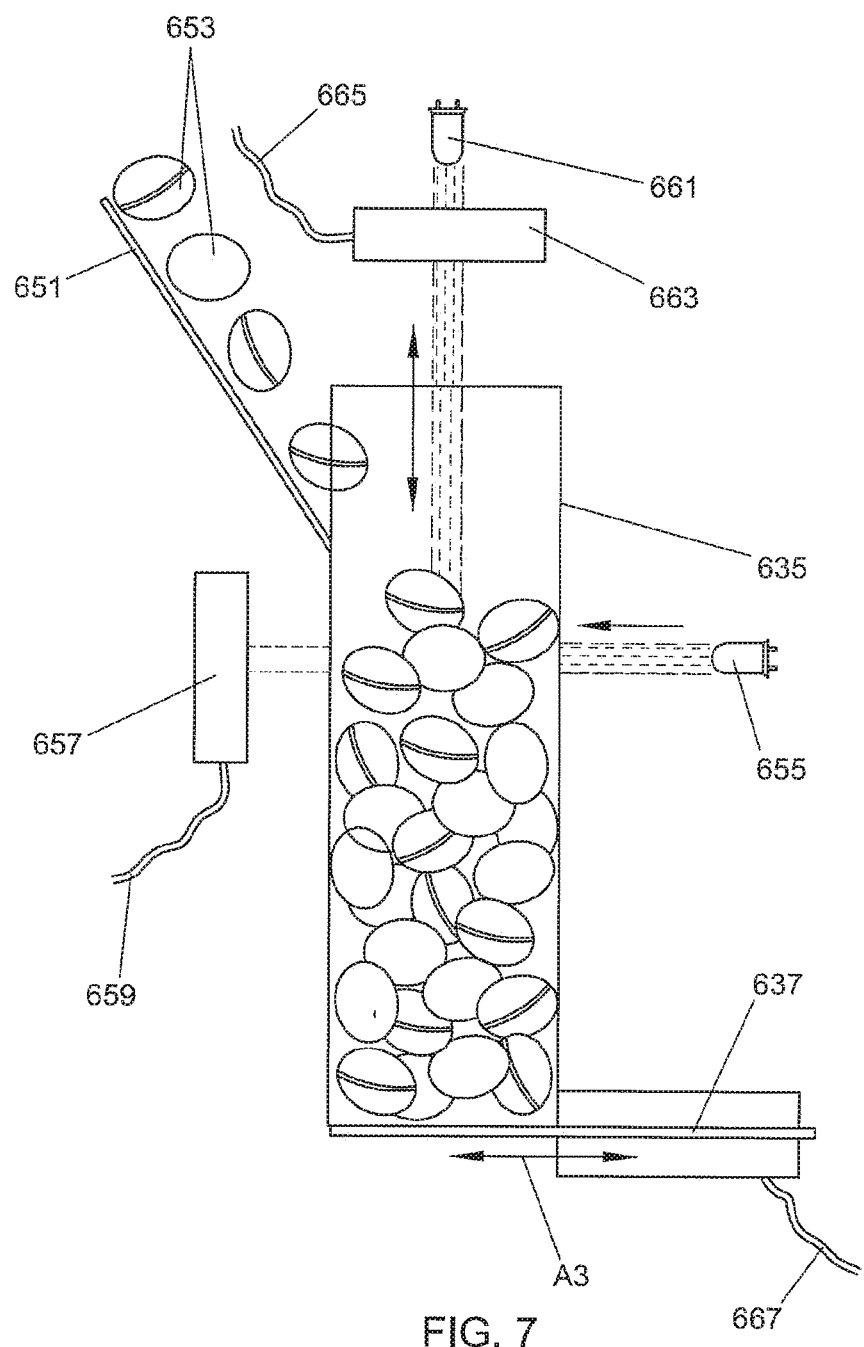
FIG. 7 is a schematic representation of a first modification of a metering principle suitable for use in a coffee bean dosing device.

FIG. 7 illustrates a slightly modified metering mechanism for incorporation in the dosing device 523 of FIG. 6. A chute 651 is employed to lead coffee beans 653 from the dosing entrance (shown as 533 in FIG. 6) to the metering chamber 635. Traversing the translucent or transparent metering chamber 635 is again a horizontal beam IR optical detection system comprising a horizontal LED-beam generator 655 and an IR detection sensor. 657. By cable 659 the IR sensor 657 can be connected to a control unit (such as control device 13A of FIG. 1). The metering mechanism of FIG. 7 is additionally provided with a further substantially vertically directed optical IR detection system comprising a vertical LED-beam generator 661.

Interruption of the horizontal IR-beam between LED 655 and sensor 657 may happen repeatedly when individual coffee beans interrupt the beam when falling into the metering chamber 635. The control unit therefore only generates a metering chamber full signal, when the interruption of the horizontal beam exceeds a predetermined period of time. As a double check for the horizontal optical detection system the vertical optical detection system is provided. The beam generated by LED-beam generator 661 is slightly slanted with respect to the vertical direction and an IR detection sensor 663 is positioned to detect a reflection of the IR beam only when it coincides with the metering level defined by the horizontal optical detection system. Alternatively the IR detection sensor 663 may detect a reflection of the IR beam, generated by the LED-beam generator 661, over a wider angle and register the time necessary for the reflection. The delay of the reflection will become shorter as the metering chamber 635 fills. Via a cable 665 this reference signal can be communicated to the control unit for comparison with the signal received from the horizontal sensor 657.

A bottom end of the metering chamber 635 is again provided with emptying means in the form of a movable release lid 637 which can be electrically operated through a cable connection 667 with the control unit (13A in FIG. 1) for sliding or rotating movement in accordance with bi-directional arrow A3.

Figure 8:
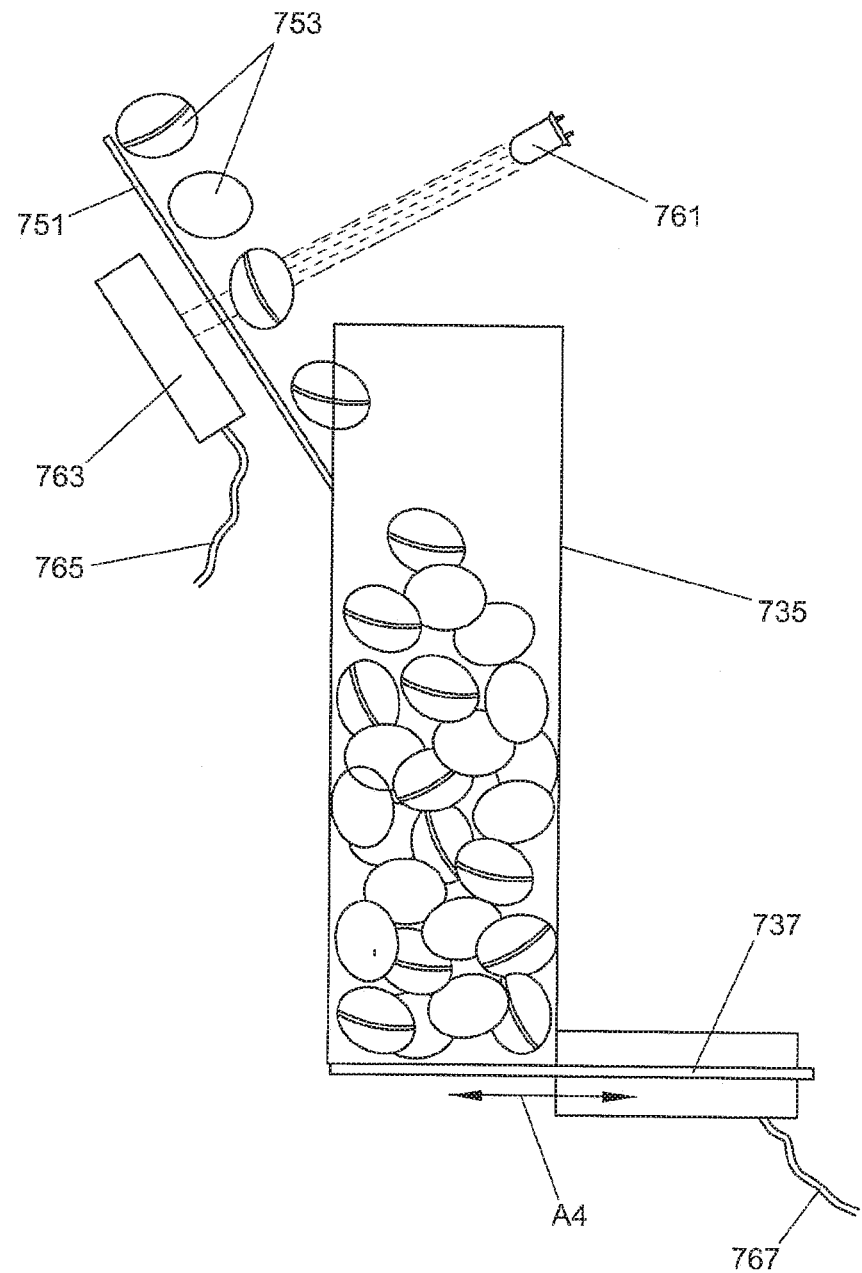
FIG. 8 is a schematic representation of a second modification of a metering principle for use in a coffee bean dosing device.

In FIG. 8 a further modification of metering mechanism is shown that is also suitable for incorporation in the dosing device 523 of FIG. 6. A chute 751 for coffee beans 753 coming from a dosing entrance (shown as 533 in FIG. 6), is translucent or transparent to IR-light. An IR-beam generator 761, of the LED-type, communicates through chute 751 with an IR detection sensor 763 to count coffee beans 753 interruption the IR-beam. A cable 765 can communicate these interruptions to a control unit, such as 13A in FIG. 1, to count the amount of coffee beans.

Once the predetermined number of beans 753 for one dosage has been counted the control unit 13A (FIG. 1) will control the drive motor 543 (FIG. 6) to return to its stop position and thereby no further beans 753 will enter the chute 751 and metering chamber 735. At the same time emptying means embodied as a movable release lid 737 may be operated through electrical lead 767 to open the lid 737 in the relevant direction of doubled headed arrow A4. Everything may be controlled by the control unit 13A.

In this example the metering chamber may also be a flat plate wherein the counted beans will drop until a predetermined amount of beans are on the plate. The coffee brewing apparatus is further arranged to tilt the plate once the predetermined amount of beans re on the plate and so that the beans are transported into the grinder mechanism. It is also possible that the metering chamber is deleted so that counted beans are directly fed into the grinder mechanism of FIG. 1. Transport of beans is stopped by the control unit if a number of beans are counted which correspond with the predetermined amount of beans.

Figure 9:
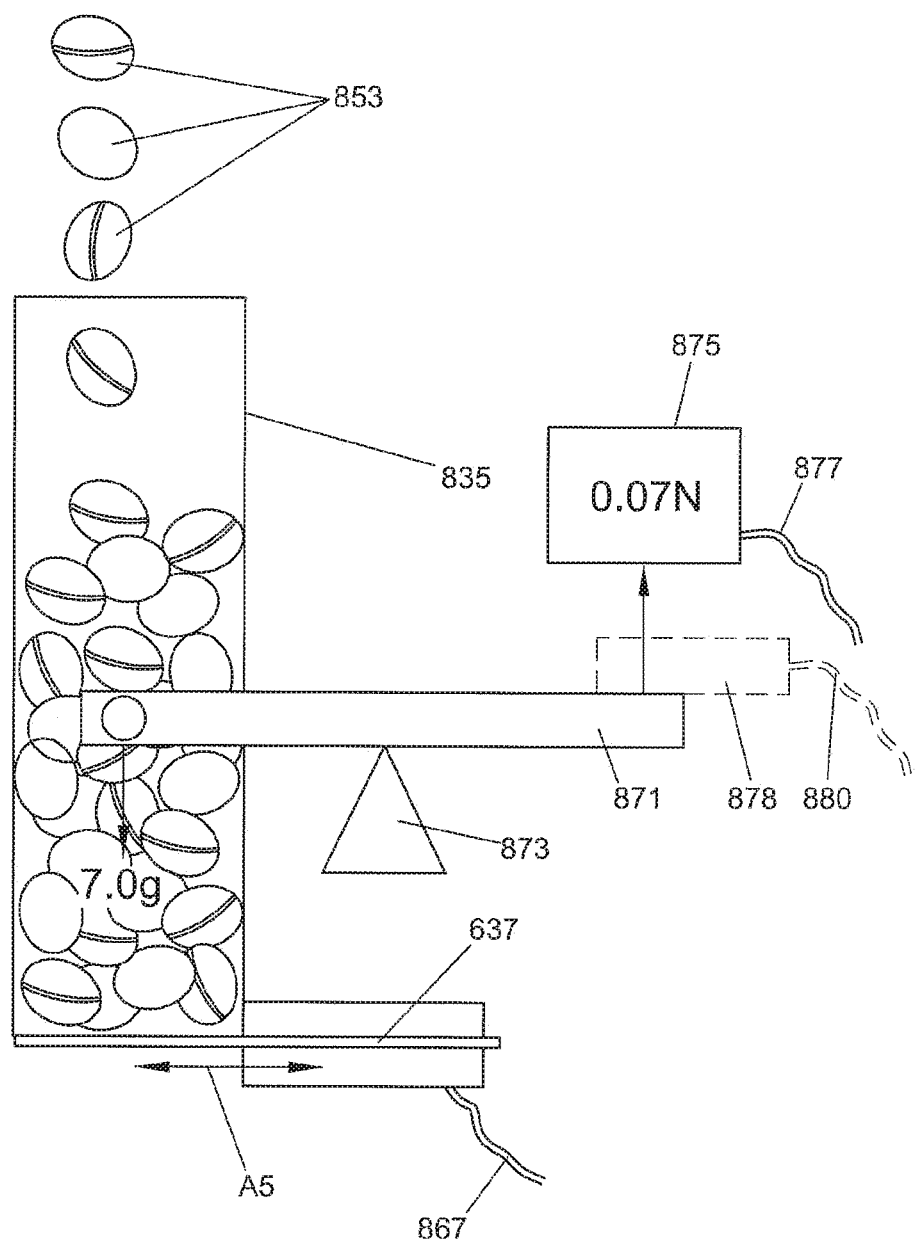
FIG. 9 is a schematic representation of a third principle of metering for use in a coffee bean dosing device.

In FIG. 9 a third alternative of the metering mechanism is illustrated in a schematic manner. Like the example illustrated in FIG. 6 the metering chamber 835 of third alternative metering mechanism does not use a chute and coffee beans 853 fall directly into the metering chamber 835. Protruding into metering chamber 835 is a basculating load support 871 which is pivotally balanced on a low friction bearing 873. When an amount of coffee beans 853 that is fallen down on the portion of the basculating load support 871 that protrudes into the metering chamber 835 reaches the weight of a predetermined dosage the basculating load supports tips about its low friction bearing 873 and activates a load detection sensor 875. The load detection sensor 875 may be arranged to be activated as soon as a weight of 7 grams of coffee beans has been reached. However, this is but an example and conceivably other weight amounts may be predefined. Upon activation the load detection sensor communicates a signal to control unit 13A (FIG. 1) via electrical lead 877. The control unit 13A (FIG. 1) thereupon may initiate stopping motor 543 (FIG. 6) and the opening of an electrically actuated release lid 837, through electrical connection 867, to open in the appropriate direction of double headed arrow A5 and empty the metering chamber. Thereby the predetermined dosage of coffee beans 853 may pass to the grinding mechanism 6 (FIG. 1). Alternatively the load support carries the metering chamber having a known predetermined weight when being empty. Unit 875 is deleted. If beans are transported into the metering chamber the weight of the chamber will increase and may be measured by means of a first sensor in the form of a force measuring unit 878 which measures the force of the bearing acting on the bearing. Also unit 878 stabilizes the bearing 871. The measuring result are communicated to the control unit 13A by means of a signal generated by means unit 878 via a cable 880. Hence this force corresponds with the weight of the metering chamber including the beans in the chamber. When the increased of weight of the metering chamber corresponds with the predetermined amount of coffee beans the control unit will stop the motive means and it will active the emptying means for emptying the metering chamber. In this example the system is thus arranged to generate by means of the first sensor means a signal corresponding with the amount of coffee beans which is present in the metering chamber.

Figure 10:
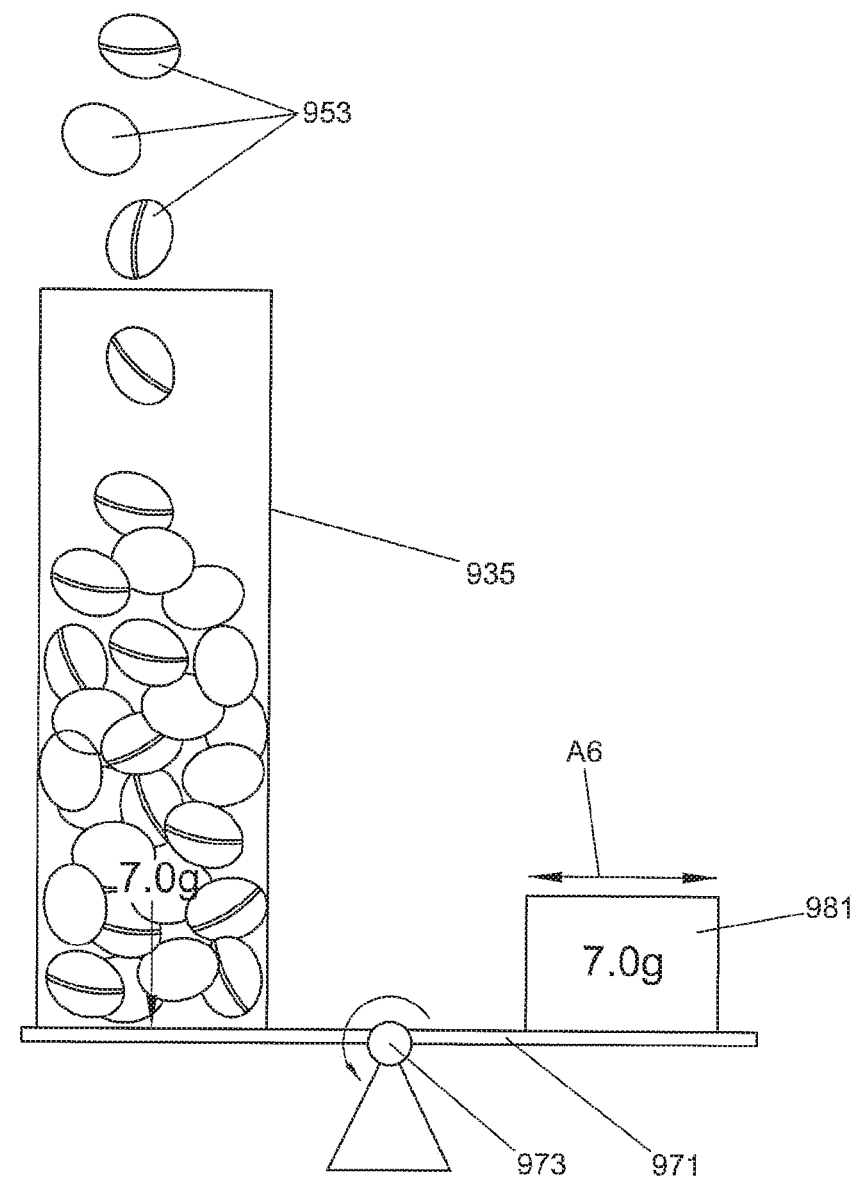
FIG. 10 is a schematic representation of a fourth metering principle for use in a coffee bean dosing device.

A fourth alternative and further simplified metering mechanism is schematically shown in FIG. 10. Like in the previous embodiment coffee beans 953 enter the metering chamber 935 in a vertical direction from above by gravity. In this simplified embodiment only mechanical means are used for metering the dosage and the functions of emptying, such as by means of a release lid, and load detection are combined into a basculating release lid 971 that is pivotally arranged about low friction bearing 973. A portion of the basculating release lid 971 coincides with metering chamber 935 and functions as its bottom. Once a predefined load of coffee beans 953 has been accumulated on this portion of the basculating release lid 971, it tilts about the low friction bearing 973 to free the passage for the dosage to a grinding mechanism. To this end the portion of the basculating release lid 971 opposite the metering chamber 935 is provided with a preset counterweight 981 of 7 grams, or like dosage weight. The counterweight 981 may be exchangeable with weights of other values, for different dosages. As further shown in FIG. 10, the weight 981 may also be adjustable in the directions of double headed arrow A6 to adjust or fine-tune the exact metering weight of coffee beans. Clearly the mechanical metering as the means for dosing of FIG. 10 should preferably cooperate with additional means to interrupt the supply of coffee beans 953 to the metering chamber 935. Such means can include any additional electric switch operated by the release lid 971 to allow the control unit 13A (of FIG. 1) to return the drive motor 543 (FIG. 6) to its inactive position in response to appropriate timing and/or sensor means. If the lid 971 tilts to free the passage as explained above there may be means to keep the lid tilted other than the beans falling out of the chamber such as an electromagnet which is activated by the control unit. After a sufficient time for emptying the chamber the control unit may deactivate the electromagnet so that the lid will close the chamber again. Rather than using the basculating release lid 971, it is also conceivable to allow the entire metering chamber 935 to tip over, once a predefined dosing amount has been reached. Such tipping over of an entire metering chamber conceivably can also be controlled by electric means actuated by the control unit. In each of the embodiments as explained above the control unit may be arranged to effect a short reverse rotation of the motive means, prior to interrupting the drive, to ensure that no bean is interfering with the exit opening. Hence in that case the conveyor means are operated shortly in reverse and if such conveyor means is provided with a closing flap as discussed above the closing flap may subsequently close the exit opening of the cartridge.

It is thus explained that the invention relates to a coffee bean packaging cartridge for use in a system for dosing and/or grinding coffee beans. The system is thereby provided with a coffee bean packaging cartridge with at least a single wall member, which surrounds an interior space for multiple dosages of coffee beans, and with a coffee bean outlet for delivering coffee beans. The apparatus is further provided with a coffee bean grinding mechanism, with a coffee bean inlet for a supply of coffee beans from the coffee bean packaging cartridge to the grinding mechanism. Connecting means are provided for connecting coffee bean packaging cartridges to the apparatus, so that the coffee bean outlet of the packaging cartridge connected to the coffee bean inlet of the apparatus that can provide a dosing unit with a single predefined amount of coffee beans from the coffee bean exit to the coffee bean inlet. The connecting means can be provided with a coupling element for coupling and uncoupling of the coffee beans packaging to and from the apparatus. The coffee beans packaging cartridge prior to use is sealed such that exposing of coffee beans to environmental air is prevented.

In the system 1 of FIG. 1 the coffee brewing apparatus 2 further comprises a brewing means 7 for brewing coffee on the basis of ground coffee beans and water wherein the brewing means is controlled by the control unit. The control unit 13A may be arranged to start operation of the brewing means 7 and/or grinder mechanism 6 only upon verifying occurrence of at least one of the relatively movable closing means having closed the exit opening or the conveyor means having interrupted. The coupling means may comprises a rotating element such as a drive shaft 171, which drives the conveyor means upon being rotated wherein the rotating element 171 is arranged to be rotated by the motive means 40 of the coffee brewing apparatus.

Figure 11:
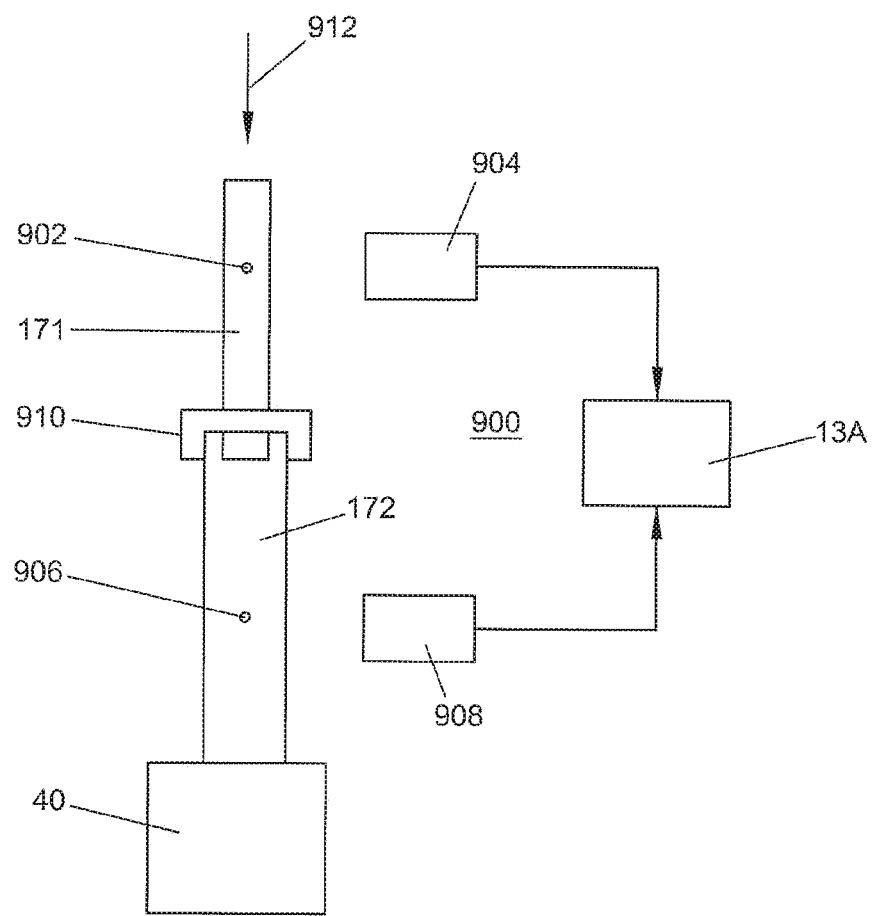
FIG. 11 a portion of a special embodiment of the system according to FIG. 1.

The system (see FIG. 11) may further comprises detection means 900 for detecting a rotational speed and/or a phase of the rotating element 171 as well as of the motive means 40 of the coffee brewing apparatus. The rotating element 171 may for example be provided with a optical mark 902 which may be detected by an optical sensor or detector 904 which is connected to the control unit 13A. If the rotating element 171 rotates the optical mark 902 will rotate too and the moments in time on which the mark is detected by means the detector 904 represent in combination the rotational speed and rotational phase of the rotating element 171. The motive means 40 may similarly provided with an optical mark 906 wherein by means of another optical detector 908 which is connected with the control unit 13A the rotating speed and rotating phase of the motive means is measured. In this example the rotating element 171 is connected to a drive shaft 172 which is connected with the motive means. The connection 910, between the rotating element 171 and the drive shaft 172, is in this example such that connection can only be carried out in known rotative positions of the rotating element 171 relative to the shaft 172 if the mark 902 and the mark 906 are vertically seen above each other (in line in vertical direction 912). The control units 13A may be arranged to only start the brewing means and/or the grinding mechanism if the detected rotational speed of the rotating element 171 is the same as the detected rotational speed of the motive means 40 and/or if the detected phase of the rotating element 171 is the same as the detected phase of the motive means 40 and the drive shaft 172.

Figure 12:
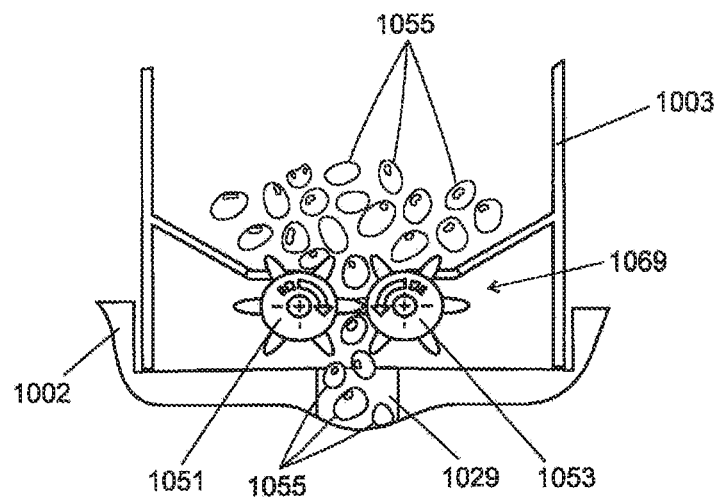
FIG. 12 in cross section shows an alternative form of conveyor means for use with the invention.
Figure 13:
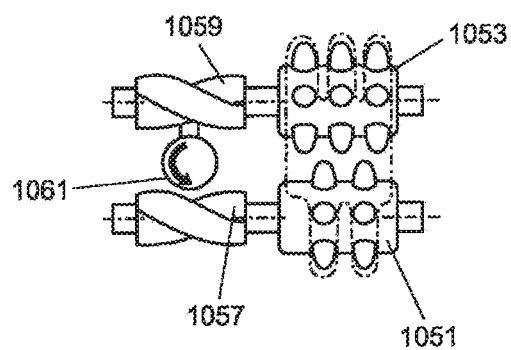
FIG. 13 is a plan view of a portion of the conveyor means of FIG. 12.

In FIGS. 12 and 13 conveyor means 1069 is part of cartridge 1003 and includes a part of counter rotating first and second rubber bean wheels 1051, 1053. The first and second rubber bean wheels 1051, 1053, each have a plurality of flexible radial protrusions extending from their circumferences. Coffee beans 1055 are conveyed between the rubber bean wheels 1051, 1053 when in motion, but the exit of the cartridge 1003 is effectively closed to prevent beans form falling out, when the rubber wheels 1051, 1053 are held stationary, by the radially extending protrusions. As seen in FIG. 12 the cartridge 1003 is positioned on top of a coffee brewing appliance 1002 and coffee beans 1055 conveyed by the conveyor means 1069 will be allowed to enter a bean supply opening 1029 of the brewing appliance 1002. As seen in the plan view arrangement of FIG. 13, the first rubber bean conveyor wheel 1051 has a first helical drive gear 1057. Similarly the second rubber conveyor wheel 1053 has a second helical drive gear 1059. Both the first and second helical drive gears 1057, 1059 are driven by an appliance drive 1061, which is part of the appliance 1002, rather than of the cartridge 1003. It is clear that the drive coupling here is not in the form of a common shaft coupling, or the like, but rather accomplished through the drive engagement of complementary gear members.

Figure 14:
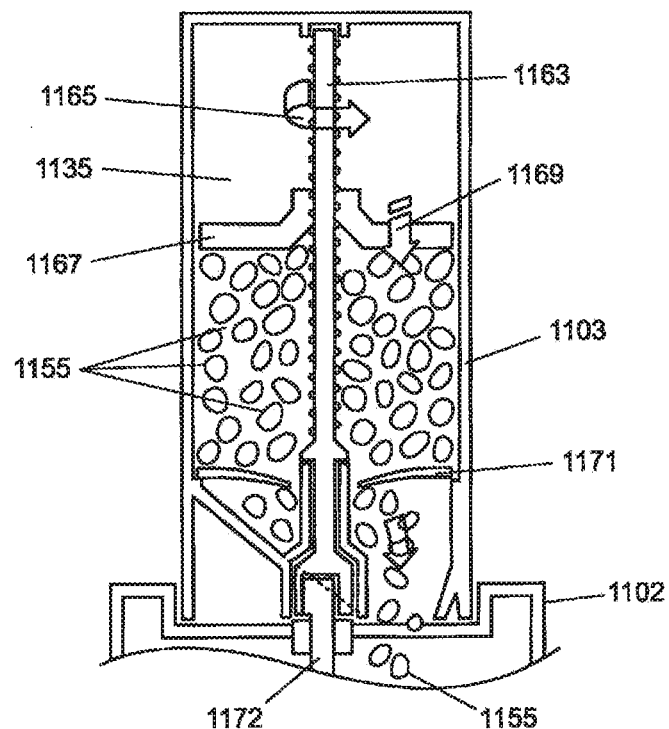
FIG. 14 is a cross section through another cartridge according to the invention employing yet another form of conveyor means.
Figure 15:
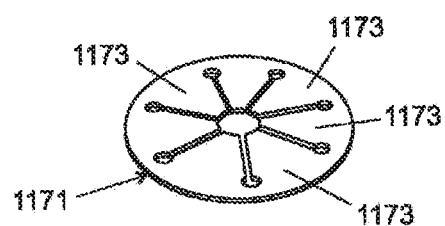
FIG. 15 is an isometric view of a flexible valve for use in the embodiment of FIG. 14.
Figure 16:
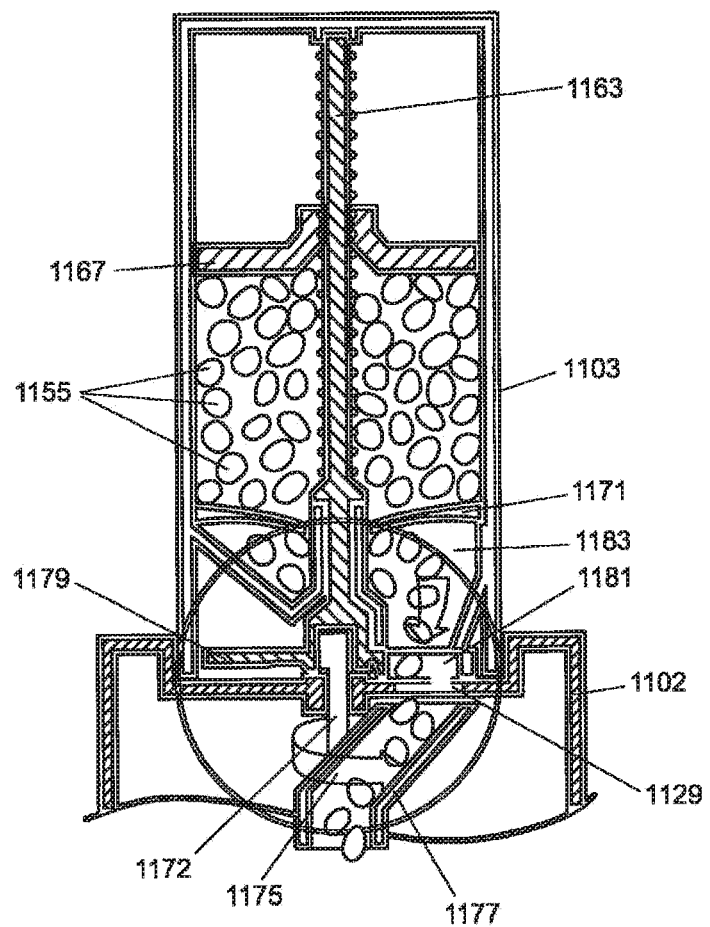
FIG. 16 is a variation on the embodiment of FIG. 14 using an additional synchronizing means in the coffee brewing appliance.

The embodiments illustrated in FIGS. 14 to 16 use a rotative drive from the appliance 1102, which is converted into a linear movement in the interior volume 1135 of the cartridge 1103. Drive shaft 1172 rotatably engages lead screw 1163 in accordance with arrow 1165 and moves a conveyor piston 1167 in a downward direction, as indicated by arrow 1169. This forces coffee beans 1155 past a flexible valve 1171. The flexible valve 1171, which is shown separately in FIG. 15, is of a relatively stiff resilient material and is radially slotted to form a number of deflectable individual flaps 1173. The stiffness given by the material of the valve 1171, to the individual flaps, separated by the radial slots, is sufficient to support a filling of coffee beans 1155 in the cartridge 1103. It is only by the force exerted by the conveyor piston 1167 that coffee beans 1155 are forced through the radial slits between the yieldable flaps 1173. Conveniently the flexible valve 1171 can be made from a plastic material. Without pressure being exerted on the flexible valve 1171, through the conveyor piston 1167 and the intervening coffee beans 1155, the beans 1155 will be prevented from falling out of the cartridge 1103. It will thereby be clear that with the cartridge 1103 engaged with a grinding and/or brewing appliance 1102 upon rotation of drive means 1172. Interruption of the rotation of drive means 1172 will stop the supply of coffee beans 1155 through the flexible valve 1171.

In the alternative of FIG. 16 a rotating chute 1177 is associated with drive shaft 1172 for rotation therewith in a direction indicated by arrow 1175. Internally of the cartridge 1103 the variation of FIG. 16 has a rotating closure member 1179 which rotates together with the lead screw 1163, when driven by the drive shaft 1172. The rotatable closure member 1179 has an exit aperture 1181 that registers with the rotating chute 1177. By stopping the drive shaft 1172 in a position where the chute 1177 is out of register with the bean supply opening 1129 of the appliance, also the exit aperture 1181 will be out of register with an internal chute 1183, formed in the cartridge 1103. Thereby and additional closure of the cartridge 1103 will be obtained, when beans 1155 are not withdrawn therefrom by the appliance 1102. To enable the exchange of unemptied cartridges 1103 from the appliance 1102 it would merely suffice when beans are prevented from falling out. However to enable stocking of partly emptied cartridges for prolonged periods of time it is certainly beneficial to counteract the entrance of air into the cartridge, at least limit exposure to ambient air. For this purpose the additional closure member 1179 may be very useful.

Figure 17A:
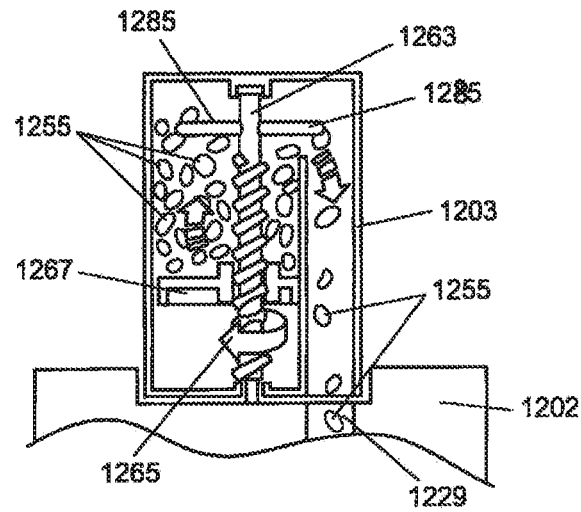
FIG. 17A in cross section shows a further embodiment of conveyor means as part of a cartridge.
Figure 17B:
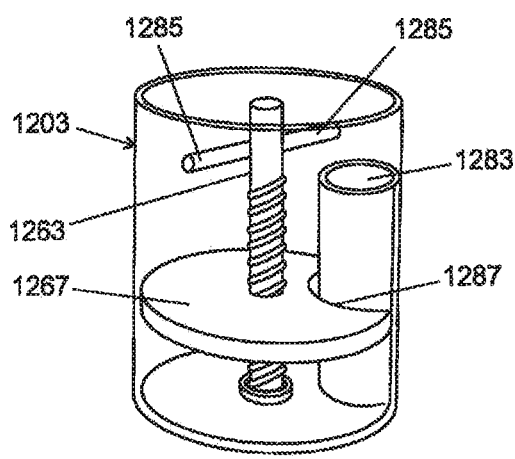
FIG. 17B is an isometric ghost view of the cartridge of FIG. 17A.

Another variation of cartridge 1203 is illustrated in FIGS. 17A and 17B. The cartridge 1203 has again a rotatable lead screw 1263, which is arranged to be driven from a coffee preparing appliance 1202 similar to the previously described embodiments. Rotation of the lead screw 1263 in the direction of arrow 1265, raised a floor forming piston 1267. Raising of the floor forming piston 1267, raised coffee beans 1255 resting on top of the floor forming piston 1267 to a level above internal chute 1283. Arms 1285 rotate together with the lead screw 1263 and assist in sweeping coffee beans 1255 at the upper surface into the internal chute 1283. It is further seen in FIG. 17B that the floor forming piston 1267 is formed with a recess 1287 that snugly fits around the internal chute 1283. When the cartridge 1203 is in the form of a cylindrical container, as represented in FIG. 17B, then the recess 1287 effectively prevents relative rotation between the floor forming piston 1267 and the remainder of cartridge 1203, without the need for other rotation preventing means. The beans 1255 that have been transferred into the chute 1283 will enter the appliance 1202 through supply opening 1229, as shown in FIG. 17A.

Yet another form of conveyor means in a cartridge 1303 is shown in FIGS. 18A to 18D. Cartridge 1303 is adapted to be connected to an appliance 1302 and to be drivingly connected to a drive shaft 1372 of the appliance 1302. The cartridge 1303 has a primary bottom 1389 having a coffee bean outlet 1311, that lines up with the bean supply opening 1329 of the appliance 1303. The cartridge 1303 is further provided with a secondary bottom 1391 that is generally funnel shaped with a lowermost position being interrupted for communication with a shuttle slider 1393.

The shuttle slider 1393 is guided for reciprocating movement by an eccentric 1395, rotatably by drive shaft 1382. See in particular FIGS. 18B and 18D. As shown in FIGS.

Figure 18A:
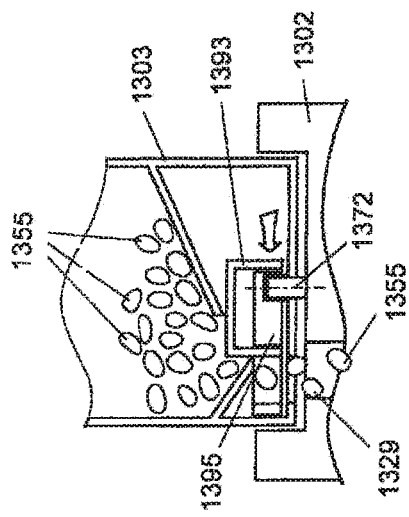
FIG. 18A is a cross sectional view through another conveyor means in a first position.
Figure 18B:
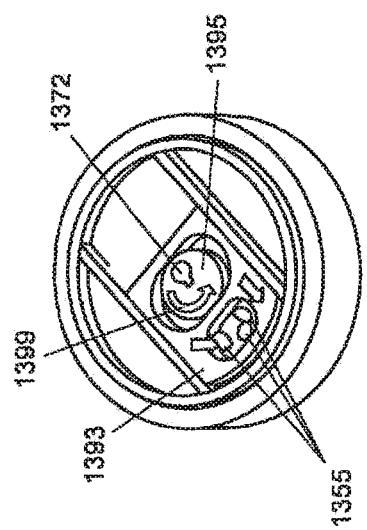
FIG. 18B is an isometric view of the conveyor means of FIG. 18A in the first position.
Figure 18C:
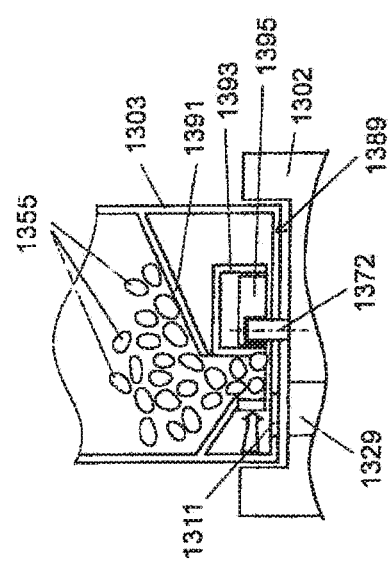
FIG. 18C is a cross sectional view of the conveyor means of FIG. 18A in a second position.
Figure 18D:
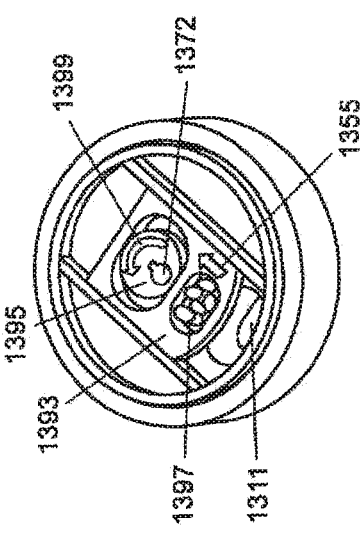
FIG. 18D is an isometric view of the conveyor means of FIG. 18A in the second position.

18A and 18B the shuttle slider 1393 has a dosing cavity 1397 holding a predefined quantity of coffee beans 1355. In a first position as shown in FIGS. 18A and 18B, the shuttle slider 1393 has its dosing cavity 1397 in communication with the supply of coffee bean 1355 supported by the secondary bottom 1391. Rotation of the eccentric 1395 in the direction of arrow 1399 will move the shuttle slider 1393 from the first position shown in FIGS. 18A and 18B, into a second position shown in FIGS. 18C and 18D. Into the second position the dosing cavity 1397 aligns with the exit opening 1311 and beans are allowed to pass through the supply opening 1329 of the appliance 1302. It will be clear to the skilled person that the embodiment of FIGS. 18A to 18D may be used for both conveyance and dosing of beans to an appliance. The number of rotations of drive shaft 1372, together with the capacity of the dosing cavity 1397 may provide an accurate dosing for a selected number of beverage servings. Also it will be clear that with the shuttle slider 1393 in either one of the first and second positions the cartridge 1303 will be closed, as communication between the supply of beans 1355 within the cartridge 1303 is not possible with an immobilized shuttle slider 1395.

Figure 19A:
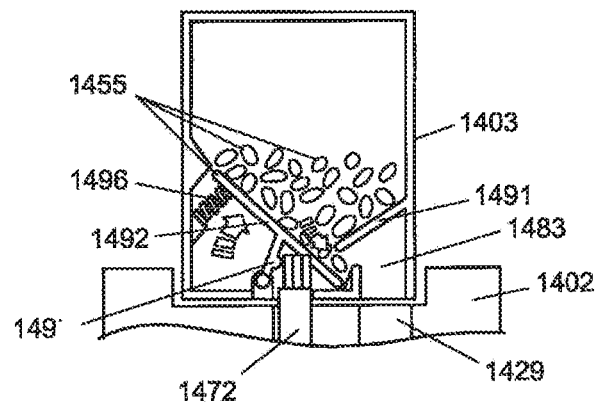
FIG. 19A in cross section shows another alternative form of conveyor means in a first position.
Figure 19B:
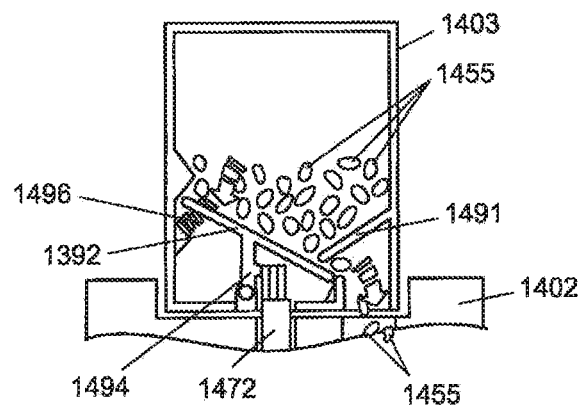
FIG. 19B shows the alternative form of conveyor means of FIG. 19A in a second position.

The conveying means illustrated in FIGS. 19A and 19B has again a secondary bottom 1491, which is completed by a tipping section 1492. Tipping section 1492 is pivoted in the vicinity of drive shaft 1472, which protrudes from appliance 1402. A top end of drive shaft 1472 is formed as an eccentric and a follower 1494 is biased against the eccentric top end of drive shaft 1472 by a spring 1496. The rotating speed of the drive shaft 1472 can be configured such that a vibrating movement is induced into the tipping section 1492. A geometry may be chosen to effect that only a single coffee bean 1455 may be admitted into a chute 1483 every time the tipping section 1492 tips, i.e. upon each rotation of the drive shaft 1472. Clearly still other arrangements will be conceived by the skilled person. While the embodiment of FIGS. 19A and 19B is shown to be biased to an open position of its tipping section 1492, it is indeed easily conceivable to arrange the tipping section in a manner that it will be biased into the closed position of the secondary bottom, so that coffee beans will not fall out when the cartridge is removed from the appliance.

Figure 20:
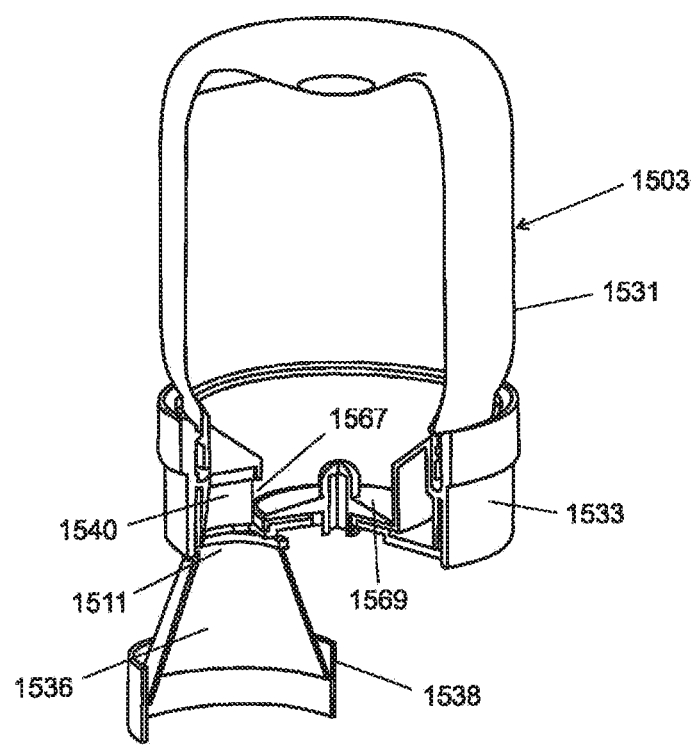
FIG. 20 partly in cross section shows a variation of the cartridge of the invention in combination with a volumetric dosing chamber of an appliance.

FIG. 20 shows a coffee bean cartridge 1503 for cooperation with a volumetric dosing chamber 1536 forming part of a coffee preparing appliance. As illustrated in FIG. 20 the cartridge 1503 is shown in a position in which it is in use on an appliance and the dosing chamber 1536 is the only element of the actual appliance that is being shown. The rest of the appliance is deleted in FIG. 20 for clarity. With the cartridge 1503 in position on the appliance, exit opening 1511 lines up with an upper open end of the dosing chamber 1536 of the appliance.

Figure 21:
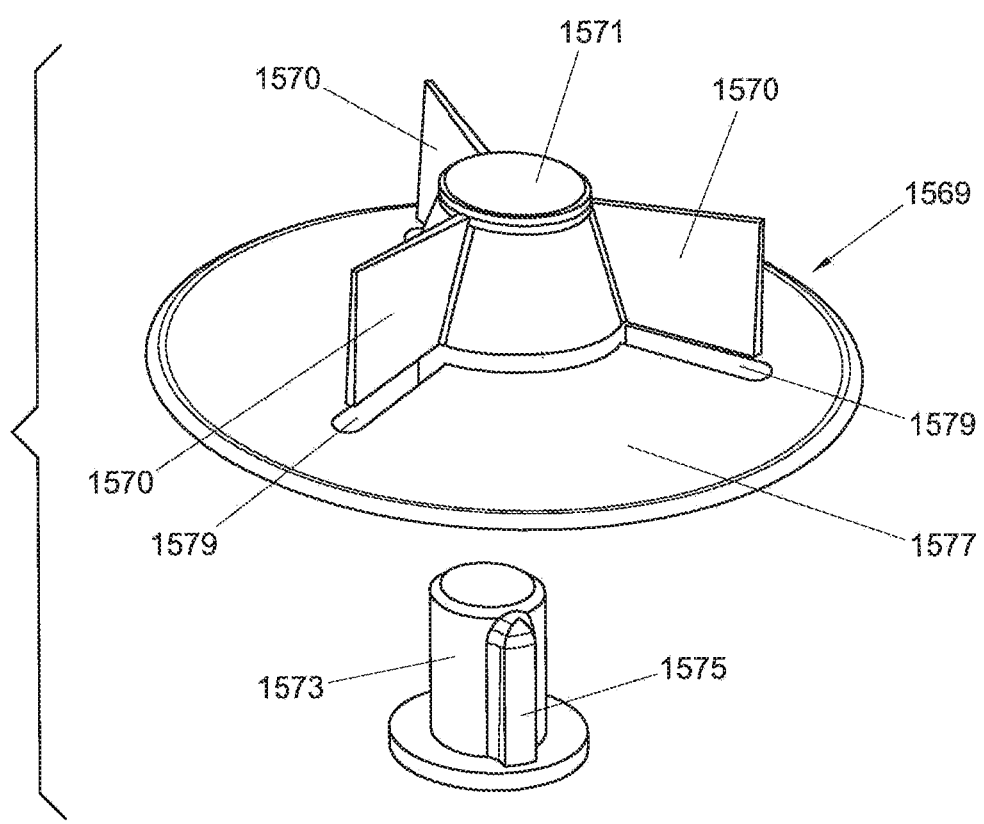
FIG. 21 is an isometric exploded view of an alternative form of conveyor disc together with a drive shaft coupling end.

Between the exit opening 1511 and a perimeter aperture 1567, a portion of the dosing volume is accommodated, in a cavity 1540. The cavity 1540 is formed in a closure member 1533 that together with a container 1531 forms the cartridge 1503 and corresponds to the communication cavity between the radially directed perimeter aperture 1567 and the axially directed exit opening 1511 as in the embodiments of FIGS. 2A to 5E. The dosing chamber 1536 may either be of a fixed volume, or may be adjustable in volume by a telescoping portion 1538, but this is optional. It is also conceivable and advantageous when the lower end of the dosing chamber 1536 is formed by a coffee bean grinder. Such a measure in combination with accommodating a portion of the dosing volume in cavity 1540 can reduce the total height of the appliance and cartridge that form a system for preparing beverages. In this particular example the dosing chamber 1536 has been given a fluted shape, like an inversed funnel. With such a shape the cross sectional area in the downstream direction of the bean path gradually increases. As an example the upstream top end of the dosing volume can have a cross-section of 25 mm$^2$, while the downstream lower end can be 400 mm$^2$ in cross-section. Filling the dosing volume formed by the dosing chamber 1536 and the cavity 1540 in the embodiment of FIG. 20 is accomplished purely mechanically by conveyor means formed as an impeller 1569. One suitable form of impeller 1569 is shown in somewhat more detail in FIG. 21. To prevent the impeller 1569 to get jammed by coffee beans that become locked between the perimeter aperture and radially extending vanes 1570, such vanes 1570 are preferably made from a resilient material. It is also possible to make the entire impeller 1569 from a yieldable resilient material. The impeller 1569 has a hollow hub portion engageable by a drive shaft end 1573 of a coffee preparing appliance. The drive shaft end 1573 may have a number of keys 1575 for engagement with corresponding protrusions, or keys (not visible in FIG. 21, but conventional), in the interior of hollow hub 1571. To facilitate engagement of the impeller 1569 and the drive shaft end upon placing of the cartridge on the appliance the number of keys may differ between the drive shaft end 1573 and the hollow hub 1571. As illustrated in FIG. 21 the vanes 1570 do not extend to the perimeter edge of the impeller 1569, which may prevent beans from becoming jammed between the vanes 1570 and the perimeter aperture 1567 (FIG. 20). As indicated hereinabove the vanes may also be of a flexible material and to provide more flexibility to the vanes the vanes are conveniently also unattached to the impeller base 1577, by leaving a gap 1579. In a practical embodiment about 20% of the dosing volume can be accommodated in the cavity 1540 and about 80% of the dosing volume will then be accommodated in the dosing chamber 1536. To fill the dosing volume some fifteen revolutions of the impeller 1569 will normally suffice. However, to ensure filling under even adverse conditions, it may be convenient to allow for some extra revolution such as thirty or twenty-five in total. For filling of the dosing volume the conveying impeller 1569 is rotated with a rotational speed in the range of 100 to 500 rpm, and preferably between 250 and 300 rpm. Once the filling of the dosing volume has been accomplished, the appliance will switch from driving the impeller 1569 to driving its grinder. With the impeller 1569 immobilised the dosing chamber 1536 and cavity 1540 will gradually empty into the grinder (not shown, but conventional). Because the impeller 1569 is inactive, no beans will escape from container 1531 through the perimeter aperture 1567. To ensure that vibration of the appliance from operation of the grinder does not allow any beans to escape, it is also possible to provide the impeller 1569 with an upstanding closing flap. Such a closing flap as described in reference to the embodiments of FIGS. 4A-4D and FIGS. 5A-5D then closes the perimeter aperture 1567 when the impeller 1569 is stopped in a predetermined position.

Figure 22:
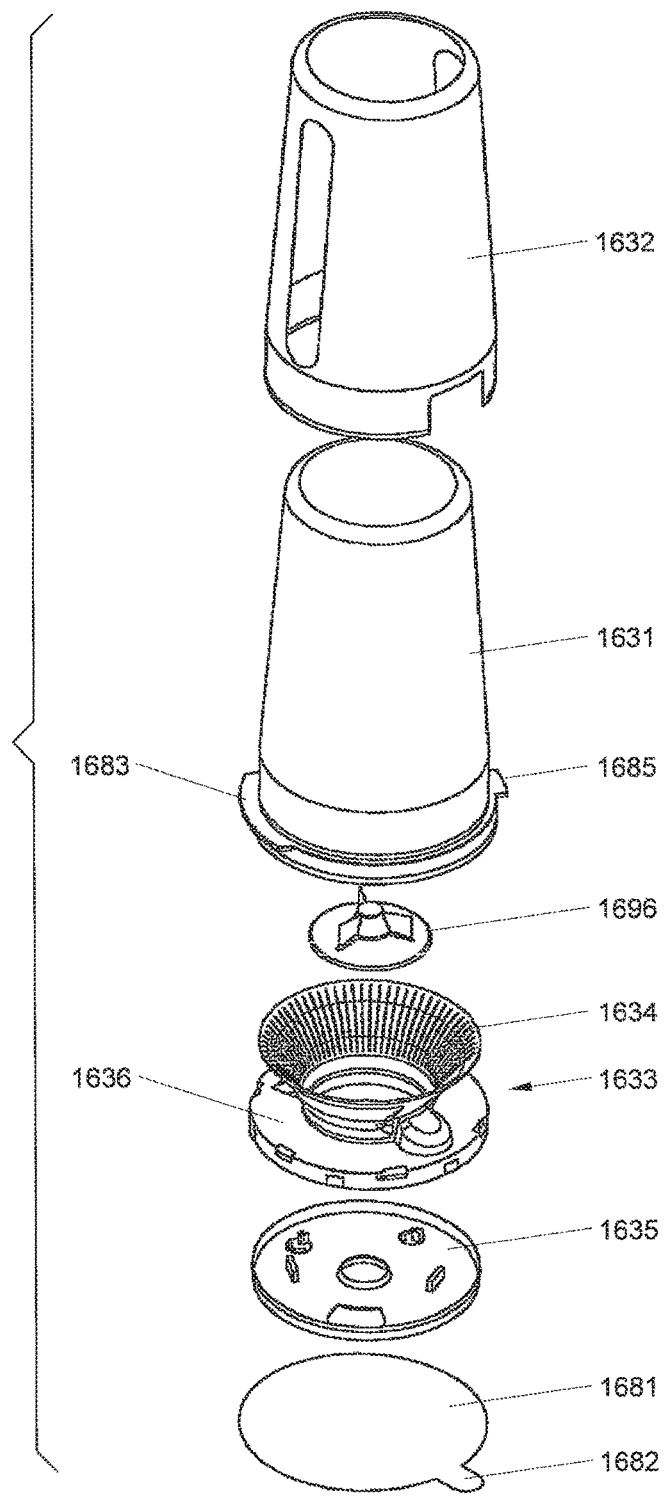
FIG. 22 is an exploded isometric view of a further embodiment of a coffee bean packaging cartridge according to the invention.

Referring to FIG. 22, a further embodiment of a coffee bean packaging cartridge is shown in an exploded arrangement comparable to FIG. 5D. This packaging cartridge includes a container 1631 defining an interior volume for coffee beans. The container 1631 is preferably made from a transparent material so that its contents can be seen. Optionally, the container 1631 may be partially covered by an outer sleeve 1632 which may be printed with a description of the kind of coffee beans inside and may also be apertured to reveal a translucent portion of the container 1631. The container 1631 is also provided at a lower end thereof with bayonet formation 1683, 1685 for coupling with a coffee preparing appliance. Inserted into an open bottom end of container 1631 is a closure member 1633. The closure member 1633 has a ribbed funnel 1634 for guiding coffee beans towards an impeller 1696 and a base flange 1636. A rotatable closure disk 1635 is rotatably connectable with respect to the base flange 1636 of the closure member 1633. The closure member 1633 and the rotatable closure disk together form an interface between the cartridge and an appliance for preparing coffee beverages. The assemble cartridge can be sealed against deterioration from the ambient air by a sealing membrane 1681 that attaches to the perimeter edge of the container 1631. The sealing membrane and barrier foil 1681 may again be equipped with a conventional one-way pressure relief valve for venting excess pressure from gases emanated from freshly roasted beans to the exterior of the packaging cartridge. Preferably such a venting valve should open at a pressure of between 0.1 bar and 0.5 bar to prevent deformation of the container by inflation. To facilitate removal of the sealing membrane 1681 before placing the cartridge on an appliance, a pulling tab 1682 may be provided.

Figures 23A, 23B:
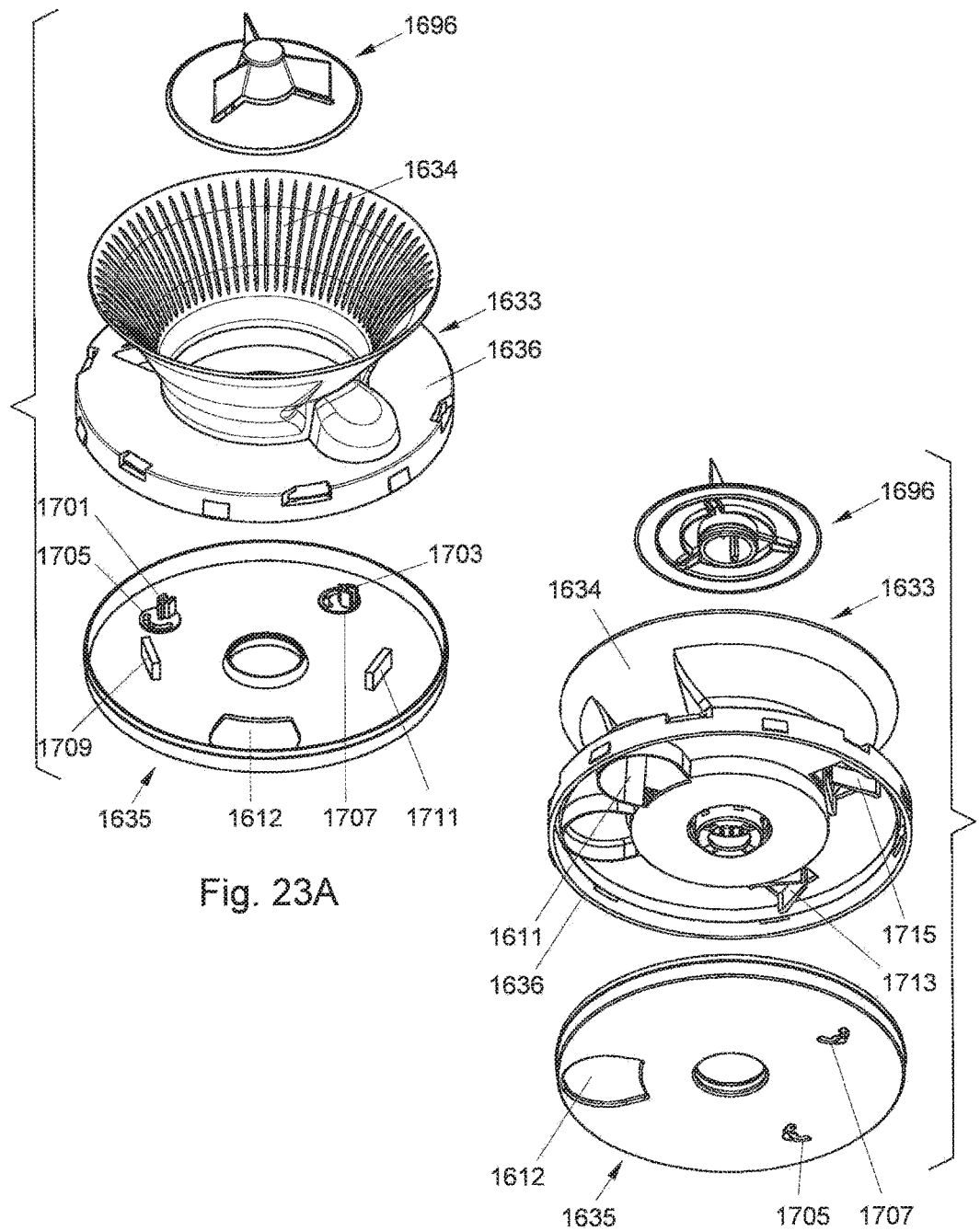
FIG. 23A is a detailed exploded isometric view of the bottom part of the packaging cartridge of FIG. 22.
FIG. 23B is a detailed exploded view of the bottom part of FIG. 23A as seen in an opposite direction.

The interface forming bottom parts of the cartridge are separately shown in more detail in FIGS. 23A and 23B. The ribbing on funnel 1634 as further seen in the exploded view of FIG. 23A is useful in preventing sticking of coffee beans to the surface of the funnel 1634.

By appropriate spacing between the successive ribs on funnel 1634 it is possible to minimise the contact surface between the beans and the funnel surface. As the skilled person will recognise, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with bean outlet 1611 of the closure member 1633 (see FIG. 23B). The closing disk 1635 on its upper surface has protruding therefrom a first detent 1701 and a second detent 1703. The first abutment is bordered by semi-circular slots 1705 and 1707, respectively. Additionally protruding from the upper surface of the rotatable closing disk 1635 is a first abutment 1709 and a second abutment 1711 for limiting rotational movement in respect of the bean outlet 1611. Further provided on a bottom face of the base flange 1636 of the closure member 1633 is a first pair of latching arms 1713 and a second pair of latching arms 1715. The first pair of flexible latching arms 1713 is positioned to cooperate with the first detent 1701 in the closed position of the rotatable closure disk 1635. The second detent 1703 and the second pair of flexible latching arms 1715 also cooperate together in the closed position of the closure disk 1635 and are optional.

Figure 24:
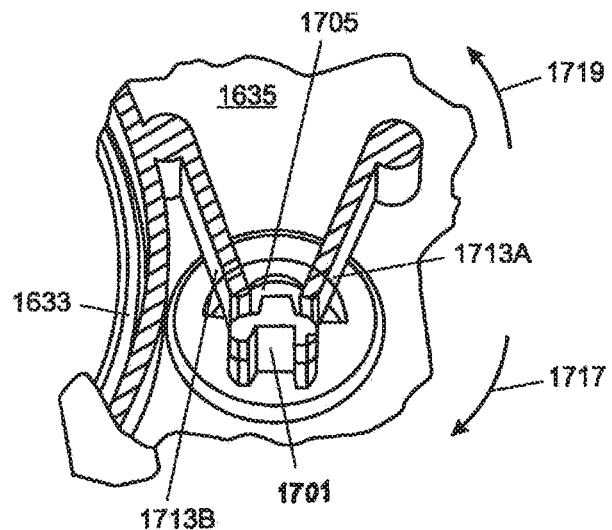
FIG. 24 is a cross-sectional detail of the assembled bottom part.

In reference to FIG. 24 it is shown how the first detent 1701 has been caught behind the converging flexible arms 1713A and 1713B of the first part of flexible arms. The position of the detent 1701, as shown in FIG. 24, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the cartridge is in the closed position as determined in the partial cross-section of FIG. 24 it may be removed from the appliance without any risk of spilling beans. Also this latching arrangement ensures that the cartridge is not accidentally opened by rotation of the closure disk 1635.

Figure 25:
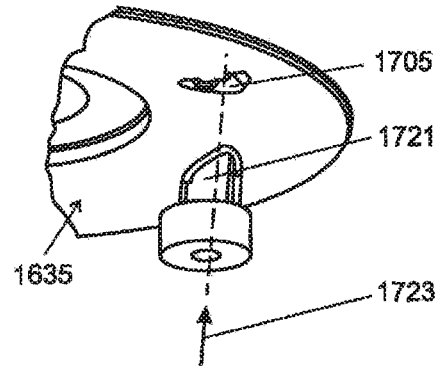
FIG. 25 is a bottom perspective detail of the bottom part of FIG. 23B with a delatching protrusion of the appliance.

As shown in FIG. 25 an unlocking element 1721, which is part of a coffee brewing appliance, can engage through the semi-circular slot 1705 in the direction of arrow 1723 when the cartridge is place on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the cartridge with respect to the appliance to engage the bayonet means 1683, 1685 on the container 1631 with counter bayonet formations on the appliance, such as the formations 529 and 530 shown in FIG. 6.

The operation of the second detent 1703 in respect of the second pair of flexible latching arms 1715 is identical and when optionally provided will give additional protection against accidental opening, when not engaged on an appliance.

Figure 26:
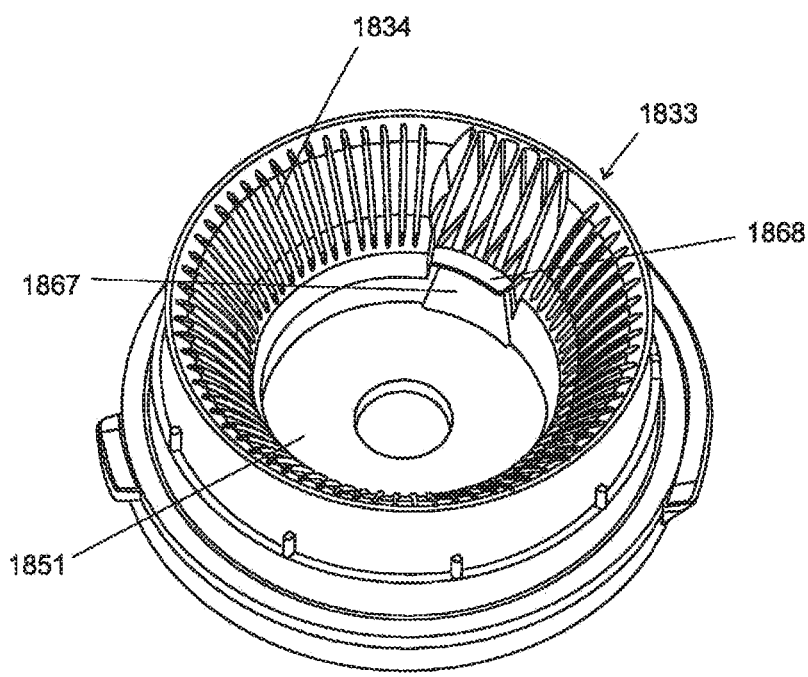
FIG. 26 shows a somewhat modified bottom part.

FIG. 26 is a somewhat modified form of a bottom part in the form of closure member 1833. The closure member 1833 has again a ribbed funnel 1834 and a perimeter aperture 1867 giving access to a buffer cavity that is offset with respect to a central area 1851. This form of bottom part is particularly adapted for use in combination with an impeller that does not have closing flaps such as numeral 175 of the embodiment of FIGS. 2A-2D, or numeral 475 of the embodiment of FIGS. 5A-5D. This type of closing flap can only be used when the impeller (not shown in FIG. 26, but explained in reference to other embodiments) is always stopped in a predetermined position. The embodiment of closure member 1833 shown in FIG. 26, is particularly adapted for use with impellers that can be stopped in any position. The prevent bean escape with the impeller in a stopped position, the perimeter opening 1867 has been provided with a canopy protrusion 1868, which in cooperation with the vanes on the impeller may block the passage of beans sufficiently, even when there is vibration in the appliance.

It is thus believed that the operation and construction of the present invention will be apparent from the foregoing description. The invention is not limited to any embodiment herein described and, within the purview of the skilled person; modifications are possible which should be considered within the scope of the appended claims. Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:
1. A coffee beverage system comprising:
  at least one coffee bean packaging cartridge for holding and supplying multiple servings of coffee beans and a coffee brewing apparatus;

the cartridge including:
- a container having an outer wall defining an interior volume and at least one exit opening defining a coffee bean outlet, the container holding at least one serving of coffee beans;
- conveyor means adapted to be rotatably driven exteriorly of the cartridge for transporting the coffee beans towards the exit opening of the cartridge; and
- coupling means adapted for drivingly coupling the conveyor means to rotating motive means of the coffee brewing apparatus, wherein the cartridge is openable to reveal the exit opening, wherein the coffee been packaging cartridge is removably connected to the coffee brewing apparatus;
- wherein the coffee brewing apparatus comprises the motive means for drivingly engaging the coupling means of the coffee bean packaging cartridge in its connected state for driving the conveyor means for transporting coffee beans from the cartridge via its exit opening into the coffee brewing apparatus, and wherein the coffee brewing apparatus further comprises a control unit for controlling the motive means;
- wherein the cartridge further including a permanent, non-removable closure member fitted to at least one end of the outer wall and at least substantially including the exit opening, wherein the closure member has relatively movable closing means for selectively opening and closing the exit opening, whereby in the closed condition it is prevented that the coffee beans escape from the cartridge;
- wherein the cartridge further includes connecting means for connecting the cartridge to a coffee brewing apparatus, wherein the closure member defines a bottom and a circumferential outer wall;
- wherein the conveyor means is adapted to be driven by the motive means of the coffee brewing apparatus, via a central opening in the bottom of the closure member; and
- wherein the relatively movable closing means and the conveyor means are adapted to be commonly driven by the motive means via the central opening in the bottom of the closure member.

2. The coffee beverage system according to claim 1, wherein the rotatably driven conveyor means includes bean agitating means.

3. The coffee beverage system according to claim 1, wherein the rotatably driven conveyor means includes rotatably movable conveyor means.

4. The coffee beverage system according to claim 1, wherein the rotatably driven conveyor means includes a rotating surface element.

5. The coffee beverage system according to claim 4, wherein the rotating surface element is a conveyor disc.

6. The coffee beverage system according to claim 1, wherein transporting of the coffee beans towards the exit opening of the cartridge is effected only partly by rotation of the conveyor means.

7. The coffee beverage system according to claim 1, further including an exit passage in the closure member, defining the exit opening, for transferring coffee beans from the interior volume.

8. The coffee beverage system according to claim 1, wherein the relatively movable closing means are adapted to be driven exteriorly of the closure member.

9. The coffee beverage system according to claim 1, wherein the conveyor means and the relatively movable closing means are fixed relative to each other.

10. The coffee beverage system according to claim 9, wherein the conveyor means and the relatively movable closing means are integrally formed as one single element.

11. The coffee beverage system according to any preceding claim 1, wherein the conveyor means and the relatively movable closing means are adapted to be commonly driven exteriorly of the closure member.

12. The coffee beverage system according to claim 1, wherein the exit opening is associated with a removable sealing element sealing the interior volume prior to activation of the cartridge wherein said sealing element prevents gasses to escape from the cartridge.

13. The coffee beverage system according to claim 5, wherein the conveyor disc has a driving hub.

14. The coffee beverage system according to claim 1, wherein the container includes a neck portion having a radially extending annular ridge, neck portion includes a cylindrical inner sleeve and a cylindrical outer sleeve defining an annular groove there between.

15. The coffee beverage system according to claim 1, wherein the conveyor means is a rotatable conveyor disc and the relatively movable closing means, for selectively closing the exit opening, includes a closing flap connected to the conveyor disc, and wherein the closing flap extends axially from the conveyor disc.

16. The coffee beverage system according to claim 1, wherein the exit passage extends between a perimeter aperture and the exit opening forming a coffee bean outlet.

17. The coffee beverage system according to claim 12, wherein the sealing element is a sealing membrane, said sealing membrane being a pre-weakened foil provided with a mechanically weakened area to control its disruption.

18. The coffee beverage system according to claim 1, wherein the connecting means for connecting the cartridge to a coffee brewing apparatus include bayonet elements for removably connecting to the coffee brewing apparatus, so as to form a coffee beverage system.

19. The coffee beverage system to claim 1, wherein the coupling means comprises a rotating element such as a drive shaft, which drives the conveyor means upon being rotated wherein the rotating element is arranged to be rotated by the motive means of the coffee brewing apparatus.

20. The coffee beverage system according to claim 1, further including a second sensor for recognising a presence of the cartridge.

* * * * *